United States Patent
Kang

(10) Patent No.: US 12,204,445 B2
(45) Date of Patent: Jan. 21, 2025

(54) METHOD OF OPERATING A STORAGE DEVICE USING MULTI-LEVEL ADDRESS TRANSLATION AND A STORAGE DEVICE PERFORMING THE SAME

(71) Applicant: SAMSUNG ELECTRONICS CO., LTD., Suwon-si (KR)

(72) Inventor: Jeonguk Kang, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 50 days.

(21) Appl. No.: 17/945,256

(22) Filed: Sep. 15, 2022

(65) Prior Publication Data

US 2023/0153238 A1    May 18, 2023

(30) Foreign Application Priority Data

Nov. 12, 2021 (KR) .................. 10-2021-0155777
Jan. 27, 2022 (KR) .................. 10-2022-0012361

(51) Int. Cl.
*G06F 12/02* (2006.01)
*G06F 13/16* (2006.01)

(52) U.S. Cl.
CPC ...... *G06F 12/0292* (2013.01); *G06F 13/1668* (2013.01); *G06F 2212/651* (2013.01)

(58) Field of Classification Search
None
See application file for complete search history.

(56) References Cited

U.S. PATENT DOCUMENTS

| | | | |
|---|---|---|---|
| 7,679,133 B2 | 3/2010 | Son et al. | |
| 8,037,279 B2 | 10/2011 | Schuba et al. | |
| 8,266,367 B2 | 9/2012 | Yu et al. | |
| 8,553,466 B2 | 10/2013 | Han et al. | |
| 8,559,235 B2 | 10/2013 | Yoon et al. | |

(Continued)

FOREIGN PATENT DOCUMENTS

| | | |
|---|---|---|
| CN | 106326134 | 1/2017 |
| CN | 113094003 | 7/2021 |
| KR | 10-2021-0076882 | 6/2021 |

OTHER PUBLICATIONS

European search report dated Apr. 19, 2023 from the European Patent Office for European Patent Application No. 22198015.4.

*Primary Examiner* — Charles Rones
*Assistant Examiner* — Ryan Dare
(74) *Attorney, Agent, or Firm* — F. CHAU & ASSOCIATES, LLC

(57) ABSTRACT

A method of operating a storage device including a non-volatile memory, the method including: generating virtual domains each of which including page mapping and block mapping tables; receiving a data input/output (I/O) request; performing a data I/O operation corresponding to the data I/O request using the virtual domains; transmitting a data I/O response to a host device in response to the data I/O request and the data I/O operation; and changing at least one of the virtual domains based on a direct request from the host device or a change in a first parameter associated with the data I/O request, and wherein, in response to the first parameter being changed, a second parameter associated with the data I/O response is changed by changing at least one of the virtual domains and by performing the data I/O operation using the changed virtual domain.

13 Claims, 26 Drawing Sheets

(56) References Cited

U.S. PATENT DOCUMENTS

| | | |
|---|---|---|
| 8,654,587 B2 | 2/2014 | Yoon et al. |
| 8,898,370 B2 | 11/2014 | Yeh et al. |
| 8,949,568 B2 | 2/2015 | Wei et al. |
| 9,477,587 B2 | 10/2016 | Wong |
| 9,612,975 B2 | 4/2017 | Li |
| 10,824,340 B2 | 11/2020 | Yeh |
| 2008/0209114 A1 | 8/2008 | Chow et al. |
| 2011/0233648 A1 | 9/2011 | Seol et al. |
| 2014/0331024 A1 | 11/2014 | Wu et al. |
| 2017/0010944 A1* | 1/2017 | Saito .................. G06F 3/0688 |
| 2018/0285159 A1 | 10/2018 | Shen et al. |
| 2019/0187900 A1* | 6/2019 | Byun .................... G06F 3/061 |
| 2020/0097661 A1* | 3/2020 | Block ................. H04L 9/3271 |
| 2020/0344758 A1 | 10/2020 | Li et al. |
| 2020/0396133 A1 | 12/2020 | Guller |
| 2021/0263779 A1 | 8/2021 | Haghighat et al. |

\* cited by examiner

| LOGICAL ADDRESS | VIRTUAL ADDRESS |
|---|---|
| LADDR1 | VADDR1 |
| LADDR2 | VADDR2 |
| LADDR3 | VADDR3 |
| ⋮ | ⋮ |

| VIRTUAL ADDRESS | PHYSICAL ADDRESS |
|---|---|
| VADDR1 | PADDR1 |
| VADDR2 | PADDR2 |
| VADDR3 | PADDR3 |
| ⋮ | ⋮ |

METHOD OF OPERATING A STORAGE DEVICE USING MULTI-LEVEL ADDRESS TRANSLATION AND A STORAGE DEVICE PERFORMING THE SAME

CROSS-REFERENCE TO RELATED APPLICATIONS

This application claims priority under 35 U.S.C. § 119 to Korean Patent Application No. 10-2021-0155777 filed on Nov. 12, 2021 and to Korean Patent Application No. 10-2022-0012361 filed on Jan. 27, 2022 in the Korean Intellectual Property Office (KIPO), the disclosures of which are incorporated by reference herein in their entireties.

1. Technical Field

Example embodiments of the present disclosure relate generally to semiconductor integrated circuits, and more particularly to methods of operating storage devices using multi-level address translation, and storage devices performing the methods.

2. Description of the Related Art

One or more semiconductor memory devices may be used in data storage devices. Examples of such data storage devices include solid state drives (SSDs). SSDs typically use flash memory and function as secondary storage. SSDs have various design and/or performance advantages over hard disk drives (HDDs). Examples include the absence of moving mechanical parts, higher data access speeds, stability, durability, and/or low power consumption. Various systems, e.g., a laptop computer, a car, an airplane, a drone, etc., have adopted SSDs for data storage.

Storage devices may operate based on a plurality of requests and/or commands received from host devices. If the requests and/or commands input to and/or output from the storage devices are biased, performance of the storage devices may be degraded. Accordingly, research is being conducted on how to efficiently handle the requests and/or commands received from the host devices.

SUMMARY

At least one example embodiment of the present disclosure provides a method of operating a storage device capable of efficiently handling or processing requests from a host device using multi-level address translation.

At least one example embodiment of the present disclosure provides a storage device that performs the method of operating the storage device.

According to example embodiments of the present disclosure, a method of operating a storage device including a nonvolatile memory is provided, the method including: generating a plurality of virtual domains, wherein each of the plurality of virtual domains includes a page mapping table and a block mapping table, the page mapping table including a relationship between a logical address received from a host device and a virtual address of a virtual block, the block mapping table including a relationship between the virtual address and a physical address of a physical block included in the nonvolatile memory; receiving a data input/output (I/O) request from the host device; performing a data I/O operation corresponding to the data I/O request using the plurality of virtual domains; transmitting a data I/O response to the host device in response to the data I/O request and the data I/O operation; and changing at least one of the plurality of virtual domains based on a direct request from the host device or a change in a first parameter associated with the data I/O request, and wherein, in response to the first parameter associated with the data I/O request being changed, a second parameter associated with the data I/O response is changed by changing at least one of the plurality of virtual domains and by performing the data I/O operation using the changed virtual domain.

According to example embodiments of the present disclosure, a storage device includes: a storage controller; and a nonvolatile memory controlled by the storage controller, wherein the storage controller is configured to: generate a plurality of virtual domains, wherein each of the plurality of virtual domains includes a page mapping table and a block mapping table, the page mapping table including a relationship between a logical address received from a host device and a virtual address of a virtual block, the block mapping table including a relationship between the virtual address and a physical address of a physical block included in the nonvolatile memory; receive a data input/output (I/O) request from the host device; perform a data I/O operation corresponding to the data I/O request using the plurality of virtual domains; transmit a data I/O response to the host device in response to the data I/O request and the data I/O operation; and change at least one of the plurality of virtual domains based on a direct request from the host device or a change in a first parameter associated with the data I/O request, and wherein, in response to the first parameter associated with the data I/O request being changed, a second parameter associated with the data I/O response is changed by changing at least one virtual domain of the plurality of virtual domains and by performing the data I/O operation using the changed virtual domain.

According to example embodiments of the present disclosure, there is provided a method of operating a storage device including a storage controller and a nonvolatile memory, the storage device configured to communicate with a host device, the method including: generating, by the storage controller, a plurality of virtual domains each of which includes a page mapping table and a block mapping table, the page mapping table including a relationship between a logical address received from the host device and a virtual address of a virtual block, the block mapping table including a relationship between the virtual address and a physical address of a physical block included in the nonvolatile memory; receiving, by the storage controller, a data input/output (I/O) request from the host device; performing, by the storage controller, a data I/O operation corresponding to the data I/O request, wherein performing the data I/O operation includes: dividing the data I/O request into a plurality of sub I/O requests; distributing the plurality of sub I/O requests to the plurality of virtual domains; translating a plurality of logical addresses included in the plurality of sub I/O requests into a plurality of virtual addresses; translating the plurality of virtual addresses into a plurality of physical addresses; and performing a data write operation or a data read operation on a plurality of physical blocks corresponding to the plurality of physical addresses; transmitting, by the storage controller, a data I/O response to the host device in response to the data I/O request and the data I/O operation; changing, by the storage controller, at least one of the plurality of virtual domains based on a direct request from the host device or a change in a workload associated with the data I/O request; and changing, by the storage controller, an operation policy of the plurality of virtual domains based on the direct request from the host device or the change in the workload associated with the data I/O request, wherein, in response to a workload associated with a first virtual domain among the plurality of virtual domains being changed, a latency of a data I/O response associated with the first virtual domain is changed by changing the first virtual domain and by performing a data I/O operation using the changed first virtual domain, and wherein the first virtual domain is changed by additionally allocating at least one physical block to the first virtual domain, or by deallocating at least one of physical blocks allocated to the first virtual domain, or by dividing the first virtual domain into two or more virtual domains, or by merging the first virtual domain and another virtual domain into one virtual domain.

In the method of operating the storage device and the storage device according to example embodiments of the present disclosure, the virtual storage space may be implemented between the logical storage space and the physical storage space, and the data I/O request may be processed based on the two-level address translation or the multi-level address translation including the logical-to-virtual address translation and the virtual-to-physical address translation. In addition, the virtual domain may be dynamically implemented (e.g., generated, deleted and/or changed) depending on the workload, the performance requirement and/or the quality of service (QoS) requirement, or the like. Accordingly, issues associated with I/O imbalance or skew may be reduced, and the storage device may have improved or enhanced performance.

BRIEF DESCRIPTION OF THE DRAWINGS

Illustrative, non-limiting example embodiments of the present disclosure will be more clearly understood from the following detailed description taken in conjunction with the accompanying drawings.

FIGS. 7, 8A and 8B are diagrams for describing a method of operating a storage device according to example embodiments.

DETAILED DESCRIPTION OF THE EMBODIMENTS

Figure 1:
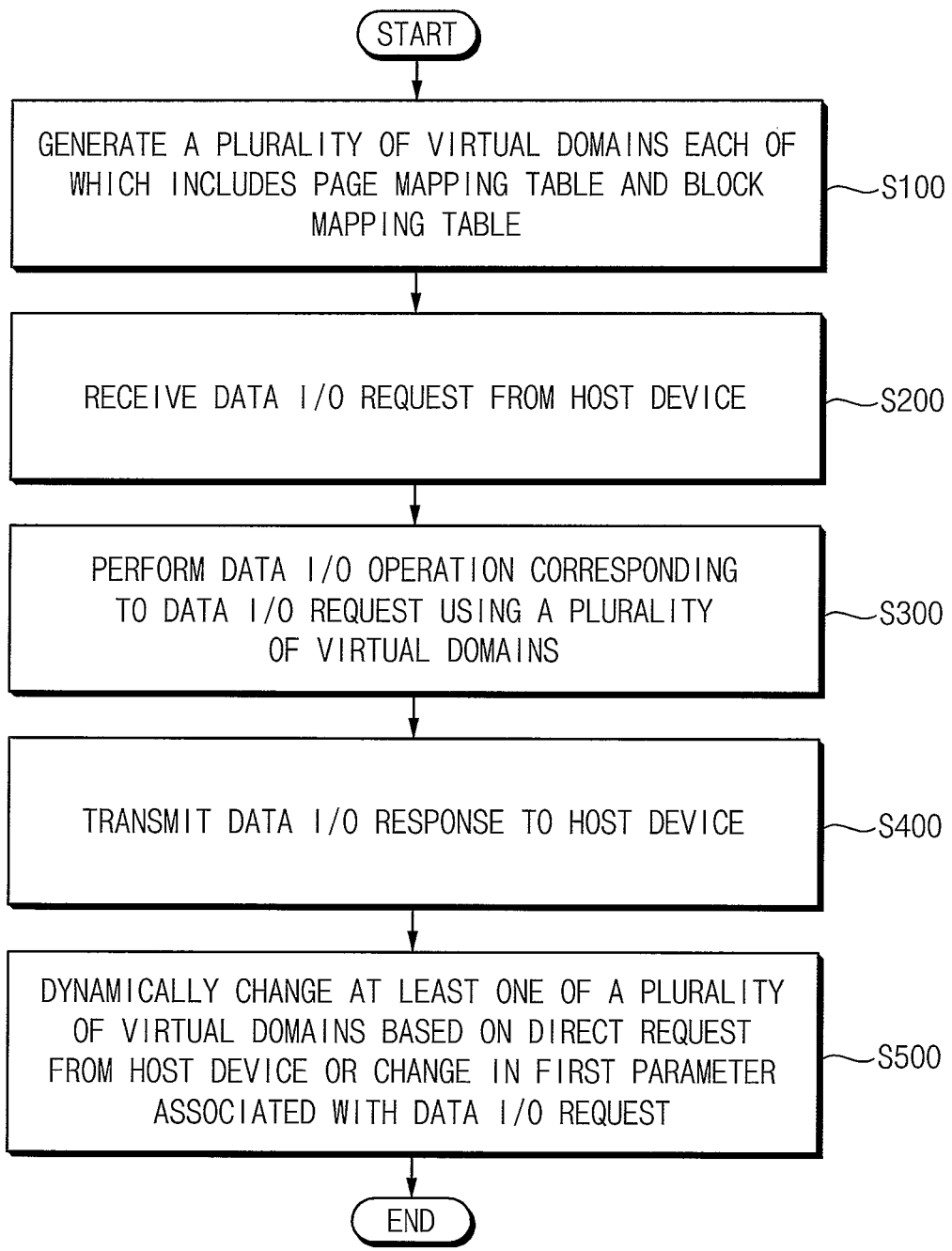
FIG. 1 is a flowchart illustrating a method of operating a storage device according to example embodiments.

Various example embodiments of the present disclosure will be described more fully with reference to the accompanying drawings. The present disclosure may, however, be embodied in many different forms and should not be construed as limited to the embodiments set forth herein. Like reference numerals may refer to like elements throughout this application.

FIG. 1 is a flowchart illustrating a method of operating a storage device according to example embodiments.

Referring to FIG. 1, a method of operating a storage device according to example embodiments is performed by a storage device that includes a storage controller and a nonvolatile memory. The storage device may operate based on or in response to requests received from a host device that is located outside the storage device. Configurations of the storage device and a storage system including the storage device will be described with reference to FIGS. 2 through 5.

In the method of operating the storage device according to example embodiments, a plurality of virtual domains each of which includes a page mapping table and a block mapping table are generated or created (step S100). The page mapping table includes or represents a relationship (or correspondence) between a logical address received from the host device and a virtual address of a virtual block (VB). The block mapping table includes or represents a relationship (or correspondence) between the virtual address and a physical address of a physical block (PB) included in the nonvolatile memory. Examples of step S100 will be described with reference to FIGS. 9 and 10.

A logical address may be an address of a storage space (e.g., a logical storage space) recognized by a host device, and a physical address may be an address of an actual storage space (e.g., a physical storage space) included in a nonvolatile memory of storage device. Typically, the host device may manage data by recognizing that storage spaces in the storage device are sequentially arranged from a first storage space to a last storage space; however, an actual arrangement of storage spaces in the storage device may be different from the arrangement of the storage spaces in the storage device recognized by the host device. Locations and sequences of data recognized by the host device may also be different from locations and sequences of data actually stored in the storage device. Thus, when a specific storage space of the storage device is to be accessed, the logical address received from the host device may be translated or converted into the physical address, and a mapping table may be used for the logical-to-physical address translation.

In the method of operating the storage device according to example embodiments, a virtual storage space may be additionally implemented or formed between a logical storage space recognized by the host device and a physical storage space in the storage device. The virtual storage space (e.g., the virtual block) may be a storage space that is not recognized by the host device, is different from the logical storage space, and is different from the physical storage space (e.g., the physical block) included in the nonvolatile memory. The virtual storage space may be a virtual space for the efficient operation of the storage device. Therefore, when a specific storage space of the storage device is to be accessed according to example embodiments, the logical address may be translated or converted into the virtual address, the virtual address may be translated or converted into the physical address, and mapping tables may be used for the logical-to-virtual address translation and the virtual-to-physical address translation.

In the method of operating the storage device according to example embodiments, the virtual domain may be defined and/or implemented such that the virtual block corresponding to the virtual storage space, the page mapping table used to perform the logical-to-virtual address translation, and the block mapping table used to perform the virtual-to-physical address translation are included in the virtual domain. Examples of the virtual domain, the page mapping table and the block mapping table will be described with reference to FIGS. 7, 8A and 8B.

A data input/output (I/O) request is received from the host device (step S200). For example, the data I/O request may include a request for the host device to access a specific storage space of the storage device, and may include at least one of a data write request and a data read request. For example, a request received from the host device may be referred to as a host command, and the data I/O request may be referred to as a host I/O command.

A data I/O operation corresponding to the data I/O request is performed using the plurality of virtual domains (step S300). For example, when the data I/O request includes at least one of the data write request and the data read request, the data I/O operation may include at least one of a data write operation and a data read operation. For example, the data I/O operation may be performed based on the above-described two-level address translation or multi-level address translation. An example of step S300 will be described with reference to FIGS. 11, 12, 13A and 13B.

A data I/O response is transmitted to the host device in response to the data I/O request and the data I/O operation (step S400). For example, the data I/O response may represent that the data I/O request and the data I/O operation are successfully processed and completed.

At least one of the plurality of virtual domains is dynamically changed based on a direct request from the host device or a change in a first parameter associated with (or related to) the data I/O request (step S500). For example, a configuration of physical blocks allocated to a specific virtual domain may be dynamically changed. For example, a configuration of a virtual domain may be dynamically changed, e.g., by dividing a specific virtual domain into two or more virtual domains or by merging a specific virtual domain with another virtual domain. Examples of step S500 will be described with reference to FIGS. 14, 15, 16, 17, 18, 19, 20, 21A, 21B, 22, 23, 24A and 24B.

In the method of operating the storage device according to example embodiments, when a virtual domain change request is received from the host device or when the first parameter associated with the data I/O request is changed, a second parameter associated with the data I/O response may be changed by dynamically changing at least one virtual domain and by performing the data I/O operation using the dynamically changed virtual domain.

In some example embodiments, the first parameter may include at least one of a workload, a performance requirement, and a quality of service (QoS) requirement associated with each of the plurality of virtual domains. The second parameter may include a latency of the data I/O response. However, example embodiments are not limited thereto, and the first and second parameters may be variously determined according to example embodiments.

In the method of operating the storage device according to example embodiments, the virtual storage space may be implemented between the logical storage space and the physical storage space, and the data I/O request may be processed based on the two-level address translation or the multi-level address translation including the logical-to-virtual address translation and the virtual-to-physical address translation. In addition, the virtual domain may be dynamically implemented (e.g., generated, deleted and/or changed) depending on the workload, the performance requirement and/or the QoS requirement, or the like. Accordingly, issues associated with an I/O imbalance or skew may be reduced, and the storage device may have improved or enhanced performance.

Figure 2:
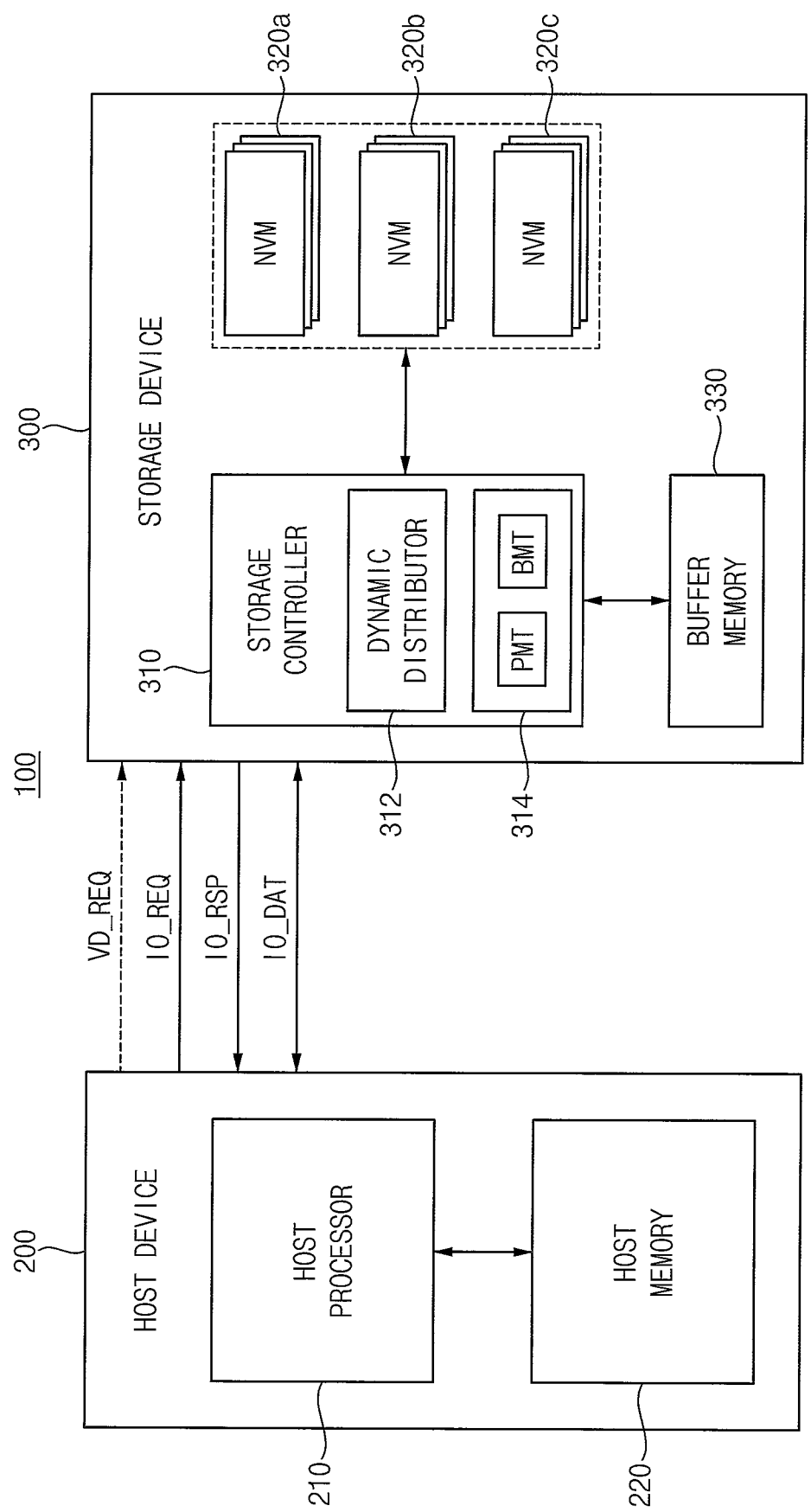
FIG. 2 is a block diagram illustrating a storage device and a storage system including the storage device according to example embodiments.

FIG. 2 is a block diagram illustrating a storage device and a storage system including the storage device according to example embodiments.

Referring to FIG. 2, a storage system 100 includes a host device 200 and a storage device 300.

The host device 200 controls overall operations of the storage system 100. The host device 200 may include a host processor 210 and a host memory 220.

The host processor 210 may control an operation of the host device 200. For example, the host processor 210 may execute an operating system (OS). For example, the operating system may include a file system for file management and a device driver for controlling peripheral devices including the storage device 300 at the operating system level. The host memory 220 may store instructions and/or data that are executed and/or processed by the host processor 210.

The storage device 300 is accessed by the host device 200. The storage device 300 may include a storage controller 310, a plurality of nonvolatile memories 320*a*, 320*b* and 320*c*, and a buffer memory 330.

The storage controller 310 may control an operation of the storage device 300. For example, the storage controller 310 may control operations (e.g., a data write operation and/or a data read operation) of the plurality of nonvolatile memories 320*a* to 320*c* based on a request and data that are received from the host device 200. For example, the storage controller 310 may receive a data I/O request IO_REQ from the host device 200, may control an exchange of data IO_DAT between the host device 200 and the storage device 300 based on the data I/O request IO_REQ, and may transmit a data I/O response IO_RSP that represents a result of the data I/O request IO_REQ to the host device 200.

The plurality of nonvolatile memories 320a to 320c may be controlled by the storage controller 310, and may store a plurality of data. For example, the plurality of nonvolatile memories 320a to 320c may store the meta data, various user data, or the like.

In some example embodiments, each of the plurality of nonvolatile memories 320a to 320c may include a NAND flash memory. In other example embodiments, each of the plurality of nonvolatile memories 320a to 320c may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The buffer memory 330 may store instructions and/or data that are executed and/or processed by the storage controller 310, and may temporarily store data stored in or to be stored into the plurality of nonvolatile memories 320a to 320c. For example, the buffer memory 330 may include at least one of various volatile memories, e.g., a static random access memory (SRAM), a dynamic random access memory (DRAM), or the like.

To perform operations according to example embodiments, the storage controller 310 may include a dynamic distributor 312 and mapping tables 314. The mapping tables 314 may include a page mapping table PMT and a block mapping table BMT.

The page mapping table PMT may include a relationship between a logical storage space recognized by the host device 200 and a virtual storage space, e.g., a relationship between a logical address received from the host device 200 and a virtual address of a virtual block.

The block mapping table BMT may include a relationship between the virtual storage space and a physical storage space included in the nonvolatile memories 320a to 320c, e.g., a relationship between the virtual address of the virtual block and a physical address of a physical block included in the nonvolatile memories 320a to 320c.

As described with reference to FIG. 1, a plurality of virtual domains may be generated and/or implemented, and one virtual domain may include one page mapping table PMT and one block mapping table BMT.

The dynamic distributor 312 may control the configuration (e.g., generation, deletion and/or change) of the plurality of virtual domains. For example, the dynamic distributor 312 may dynamically change the plurality of virtual domains. For example, the dynamic distributor 312 may dynamically change an operation policy of the plurality of virtual domains.

The storage controller 310 may perform the method of operating the storage device according to example embodiments described with reference to FIG. 1. For example, the storage controller 310 may generate the plurality of virtual domains each of which includes the page mapping table PMT and the block mapping table BMT, may receive the data I/O request IO_REQ from the host device 200, may perform a data I/O operation corresponding to the data I/O request IO_REQ using the plurality of virtual domains, may transmit the data I/O response IO_RSP to the host device 200 in response to the data I/O request IO_REQ and the data I/O operation, and may dynamically change at least one of the plurality of virtual domains when a virtual domain change request VD_REQ is received from the host device 200 or when a first parameter (e.g., workload, performance requirement, QoS requirement, or the like) associated with the data I/O request IO_REQ is changed.

In addition, the storage controller 310 may perform a method of operating a storage device according to example embodiments, which will be described with reference to FIGS. 25 and 26. For example, the storage controller 310 may dynamically change the operation policy of the plurality of virtual domains.

In some example embodiments, the storage device 300 may be a solid state drive (SSD), a universal flash storage (UFS), a multi-media card (MMC) or an embedded multi-media card (eMLMC). In other example embodiments, the storage device 300 may be one of a secure digital (SD) card, a micro SD card, a memory stick, a chip card, a universal serial bus (USB) card, a smart card, a compact flash (CF) card, or the like.

In some example embodiments, the storage device 300 may be connected to the host device 200 via a block accessible interface which may include, for example, a UFS, an eMMC, a nonvolatile memory express (NVMe) bus, a serial advanced technology attachment (SATA) bus, a small computer small interface (SCSI) bus, a serial attached SCSI (SAS) bus, or the like. The storage device 300 may use a block accessible address space corresponding to an access size of the plurality of nonvolatile memories 320a to 320c to provide the block accessible interface to the host device 200, for allowing the access by units of a memory block with respect to data stored in the plurality of nonvolatile memories 320a to 320c.

Figure 3:
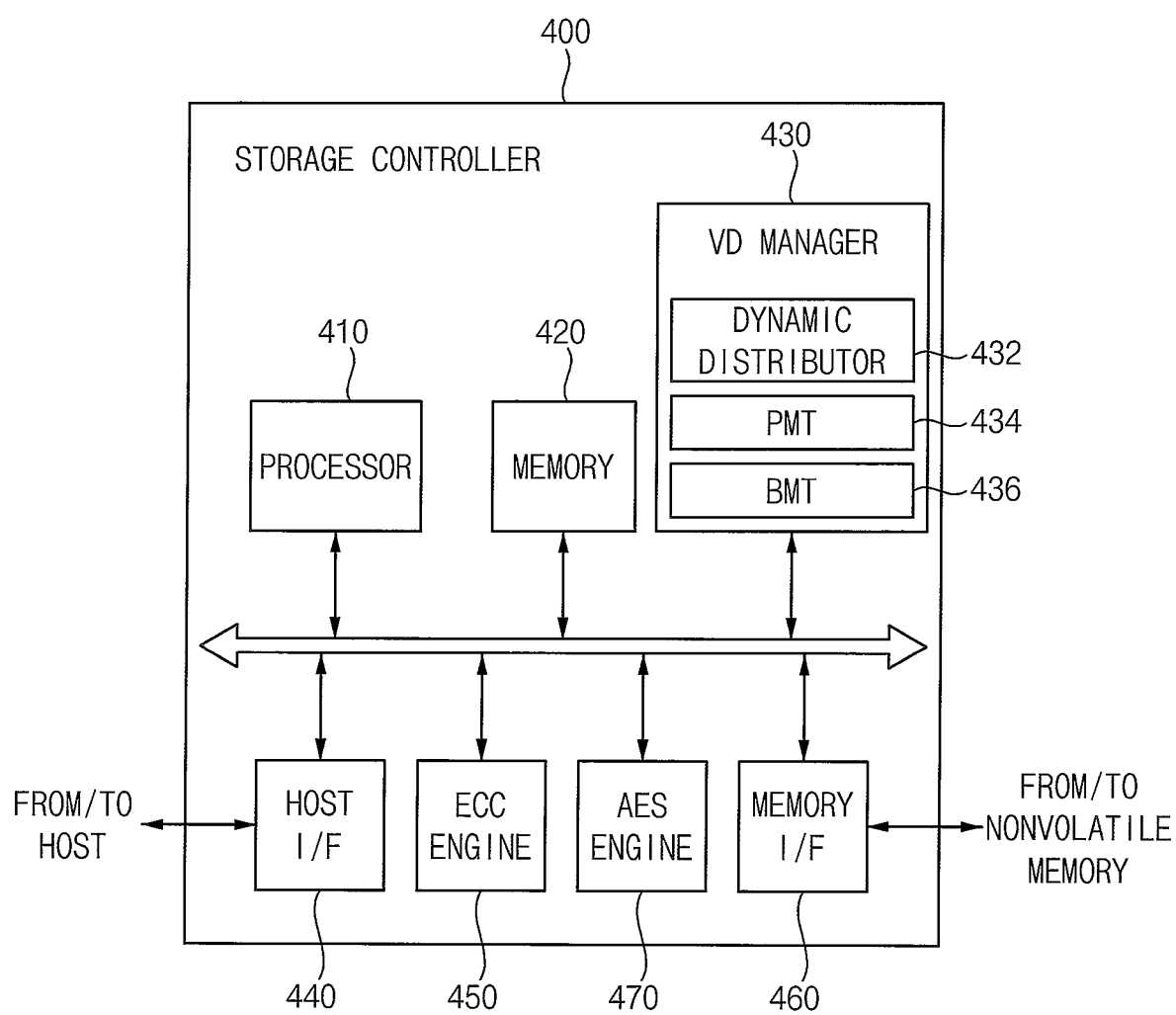
FIG. 3 is a block diagram illustrating an example of a storage controller included in a storage device according to example embodiments.

FIG. 3 is a block diagram illustrating an example of a storage controller included in a storage device according to example embodiments.

Referring to FIG. 3, a storage controller 400 may include a processor 410, a memory 420, a virtual domain (VD) manager 430, a host interface 440, an error correction code (ECC) engine 450, a memory interface 460 and an advanced encryption standard (AES) engine 470.

The processor 410 may control an operation of the storage controller 400 in response to a request received via the host interface 440 from a host device the host device 200 in FIG. 2). For example, the processor 410 may control an operation of a storage device (e.g., the storage device 300 in FIG. 2), and may control respective components of the storage device by employing firmware for operating the storage device.

The memory 420 may store instructions and data executed and processed by the processor 410. For example, the memory 420 may be implemented with a volatile memory, such as a DRAM, a SRAM, a cache memory, or the like.

The virtual domain manager 430 may include a dynamic distributor 432, a page mapping table 434 and a block mapping table 436 that are used to perform the method of operating the storage device according to example embodiments. The dynamic distributor 432, the page mapping table 434 and the block mapping table 436 may be substantially the same as the dynamic distributor 312, the page mapping table PMT and the block mapping table BMT in FIG. 2, respectively. For example, the virtual domain manager 430 may be included in a flash translation layer (FTL) that performs various functions, such as an address mapping operation, a wear-leveling operation, a garbage collection operation, or the like.

The ECC engine 450 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The host interface 440 may provide physical connections between the host device and the storage device. The host interface 440 may provide an interface corresponding to a bus format of the host device for communication between the host device and the storage device. In some example embodiments, the bus format of the host device may be a small computer system interface (SCSI) or a serial attached SCSI (SAS) interface. In other example embodiments, the bus format of the host device may be a USB, a peripheral component interconnect (PCI) express (PCIe), an advanced technology attachment (ATA), a parallel ATA (PATH), a serial ATA (SATA), a nonvolatile memory (NVM) express (NVMe), a compute express link (CXL), etc., format.

The memory interface 460 may exchange data with a nonvolatile memory the nonvolatile memories 320a to 320c in FIG. 2). The memory interface 460 may transfer data to the nonvolatile memory, or may receive data read from the nonvolatile memory. In some example embodiments, the memory interface 460 may be connected to the nonvolatile memory via one channel. In other example embodiments, the memory interface 460 may be connected to the nonvolatile memory via two or more channels. For example, the memory interface 460 may be configured to comply with a standard protocol, such as Toggle or open NAND flash interface (ONFI).

The AES engine 470 may perform at least one of an encryption operation and a decryption operation on data input to the storage controller 400 by using a symmetric-key algorithm. The AES engine 470 may include an encryption module and a decryption module. For example, the encryption module and the decryption module may be implemented as separate modules. As another example, one module capable of performing both encryption and decryption operations may be implemented in the AES engine 470.

Figure 4:
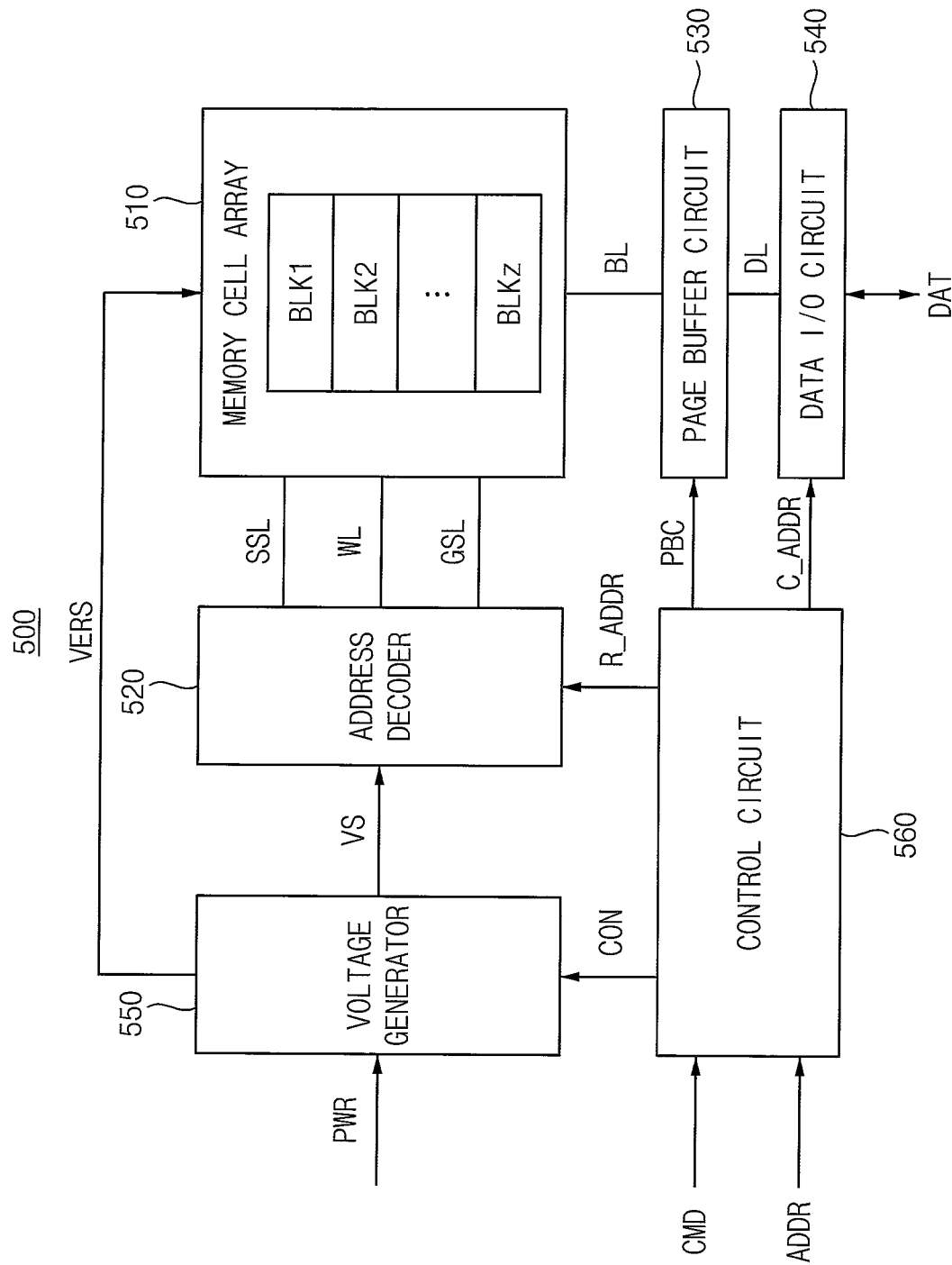
FIG. 4 is a block diagram illustrating an example of a nonvolatile memory included in a storage device according to example embodiments.

FIG. 4 is a block diagram illustrating an example of a nonvolatile memory included in a storage device according to example embodiments.

Referring to FIG. 4, a nonvolatile memory 500 includes a memory cell array 510, an address decoder 520, a page buffer circuit 530, a data input/output (I/O) circuit 540, a voltage generator 550 and a control circuit 560.

The memory cell array 510 is connected to the address decoder 520 via a plurality of string selection lines SSL, a plurality of wordlines WL and a plurality of ground selection lines GSL. The memory cell array 510 is further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, ..., BLKz each of which includes memory cells. In addition, each of the plurality of memory blocks BLK1 to BLKz may be divided into a plurality of pages.

In some example embodiments, the plurality of memory cells included in the memory cell array 510 may be arranged in a two-dimensional (2D) array structure or a three-dimensional (3D) vertical array structure. The 3D vertical array structure may include vertical cell strings that are vertically oriented such that at least one memory cell is located over another memory cell. The at least one memory cell may comprise a charge trap layer. The following patent documents, which are hereby incorporated by reference in their entireties, describe configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and U.S. Pat. Pub. No. 2011/0233648.

The control circuit 560 receives a command CMD and an address ADDR from an outside (e.g., from the storage controller 310 in FIG. 2), and controls erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recovery read operation.

For example, the control circuit 560 may generate control signals CON, which are used for controlling the voltage generator 550, and may generate a control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL. For example, in the data erase/write/read operations, the address decoder 520 may determine at least one of the plurality of wordlines WL as a selected wordline, may determine at least one of the plurality of string selection lines SSL as a selected string selection line, and may determine at least one of the plurality of ground selection lines GSL as a selected ground selection line, based on the row address R_ADDR.

The voltage generator 550 may generate voltages VS that are required for an operation of the nonvolatile memory 500 based on a power PWR and the control signals CON. The voltages VS may be applied to the plurality of string selection lines SSL, the plurality of wordlines WL and the plurality of ground selection lines GSL via the address decoder 520. In addition, the voltage generator 550 may generate an erase voltage VERS that is required for the data erase operation based on the power PWR and the control signals CON. The erase voltage VERS may be applied to the memory cell array 510 directly or via the bitline BL.

The page buffer circuit 530 may be connected to the memory cell array 510 via the plurality of bitlines BL. The page buffer circuit 530 may include a plurality of page buffers. The page buffer circuit 530 may store data DAT to be programmed into the memory cell array 510 or may read data DAT sensed from the memory cell array 510. In other words, the page buffer circuit 530 may operate as a write driver or a sensing amplifier depending on an operation mode of the nonvolatile memory 500.

The data I/O circuit 540 may be connected to the page buffer circuit 530 via data lines DL. The data I/O circuit 540 may provide the data DAT from the outside of the nonvolatile memory 500 to the memory cell array 510 via the page buffer circuit 530 or may provide the data DAT from the memory cell array 510 to the outside of the nonvolatile memory 500, based on the column address C_ADDR.

Figure 5:
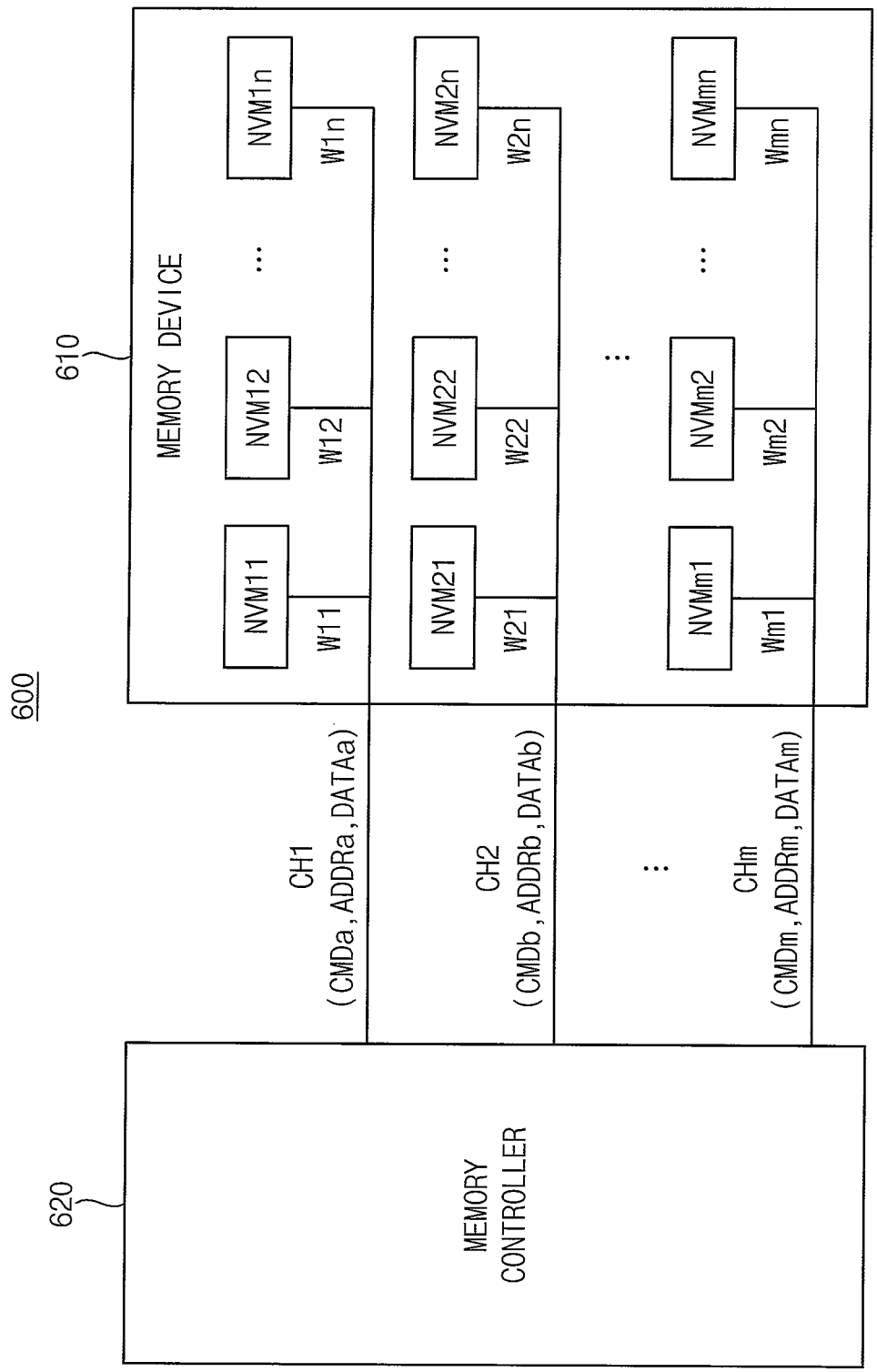
FIG. 5 is a block diagram illustrating a nonvolatile memory and a memory system including the nonvolatile memory according to example embodiments.

FIG. 5 is a block diagram illustrating a nonvolatile memory and a memory system including the nonvolatile memory according to example embodiments.

Referring to FIG. 5, a memory system 600 may include a memory device 610 and a memory controller 620. The memory system 600 may support a plurality of channels CH1, CH2, . . . , CHm, and the memory device 610 may be connected to the memory controller 620 through the plurality of channels CH1 to CHm. For example, the memory system 600 may correspond to the storage device 300 in FIG. 2.

The memory device 610 may include a plurality of nonvolatile memories NVM11, NVM12, . . . , NVM1$n$, NVM21, NVM22, . . . , NVM2$n$, NVMm1, NVMm2, . . . , NVMmn. For example, the nonvolatile memories NVM11 to NVMmn may correspond to the nonvolatile memories 320$a$ to 320$c$ in FIG. 2. Each of the nonvolatile memories NVM11 to NVMmn may be connected to one of the plurality of channels CH1 to CHm through a way corresponding thereto. For example, the nonvolatile memories NVM11 to NVM1$n$ may be connected to the first channel CH1 through ways W11, W12, . . . , W1$n$, the nonvolatile memories NVM21 to NVM2$n$ may be connected to the second channel CH2 through ways W21, W22, . . . , W2$n$, and the nonvolatile memories NVMm1 to NVMmn may be connected to the m-th channel CHm through ways Wm1, Wm2, . . . , Wmn. In some example embodiments, each of the nonvolatile memories NVM11 to NVMmn may be implemented as a memory unit that may operate according to an individual command from the memory controller 620.

The memory controller 620 may transmit and receive signals to and from the memory device 610 through the plurality of channels CH1 to CHm. For example, the memory controller 620 may correspond to the storage controller 310 in FIG. 2. For example, the memory controller 620 may transmit commands CMDa, CMDb, . . . , CMDm, addresses ADDRa, ADDRb, . . . , ADDRm and data DATAa, DATAb, . . . , DATAm to the memory device 610 through the channels CH1 to CHm or may receive the data DATAa to DATAm from the memory device 610.

The memory controller 620 may select one of the nonvolatile memories NVM11 to NVMmn, which is connected to each of the channels CH1 to CHm, by using a corresponding one of the channels CH1 to CHm, and may transmit and receive signals to and from the selected nonvolatile memory. For example, the memory controller 620 may select the nonvolatile memory NVM11 from among the nonvolatile memories NVM11 to NVM1$n$ connected to the first channel CH1. The memory controller 620 may transmit the command CMDa, the address ADDRa and the data DATAa to the selected nonvolatile memory NVM11 through the first channel CH1 or may receive the data DATAa from the selected nonvolatile memory NVM11.

The memory controller 620 may transmit and receive signals to and front the memory device 610 in parallel through different channels. For example, the memory controller 620 may transmit the command CMDb to the memory device 610 through the second channel CH2 while transmitting the command CMDa to the memory device 610 through the first channel CH1. For example, the memory controller 620 may receive the data DATAb from the memory device 610 through the second channel CH2 while receiving the data DATAa from the memory device 610 through the first channel CH1.

The memory controller 620 may control overall operations of the memory device 610. The memory controller 620 may transmit a signal to the channels CH1 to CHm and may control each of the nonvolatile memories NVM11 to NVMmn connected to the channels CH1 to CHm. For example, the memory controller 620 may transmit the command CMDa and the address ADDRa to the first channel CH1 and may control one selected from among the nonvolatile memories NVM11 to NVM1$n$. As another example, the memory controller 620 may transmit the command CMDb and the address ADDRb to the second channel CH2 and may control one selected from among the nonvolatile memories NVM21 to NVM2$n$.

Each of the nonvolatile memories NVM11 to NVMmn may operate under the control of the memory controller 620. For example, the nonvolatile memory NVM11 may program the data DATAa based on the command CMDa, the address ADDRa and the data DATAa provided from the memory controller 620 through the first channel CH1. For example, the nonvolatile memory NVM21 may read the data DATAb based on the command CMDb and the address ADDRb provided from the memory controller 620 through the second channel CH2 and may transmit the read data DATAb to the memory controller 620 through the second channel CH2.

Although FIG. 5 illustrates an example where the memory device 610 communicates with the memory controller 620 through m channels and includes n nonvolatile memories corresponding to each of the channels, the number of channels and the number of nonvolatile memories connected to one channel may be variously determined according to example embodiments.

Figure 6A:
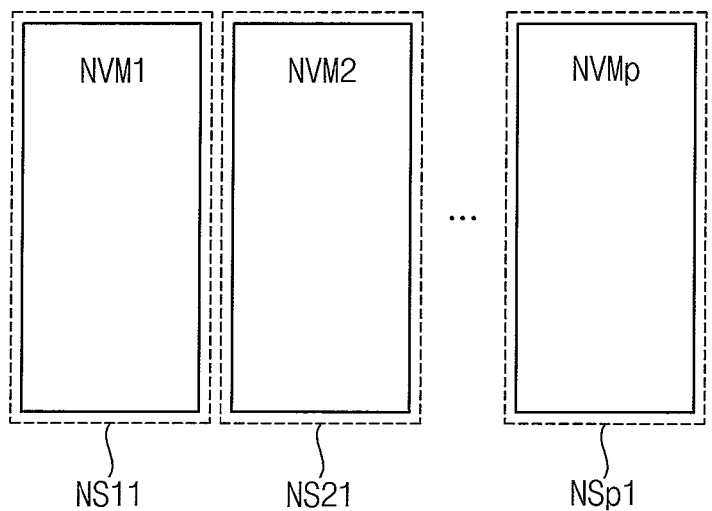
FIGS. 6A and 6B are diagrams for describing logical storage spaces that are set on nonvolatile memories included in a storage device according to example embodiments.
Figure 6B:
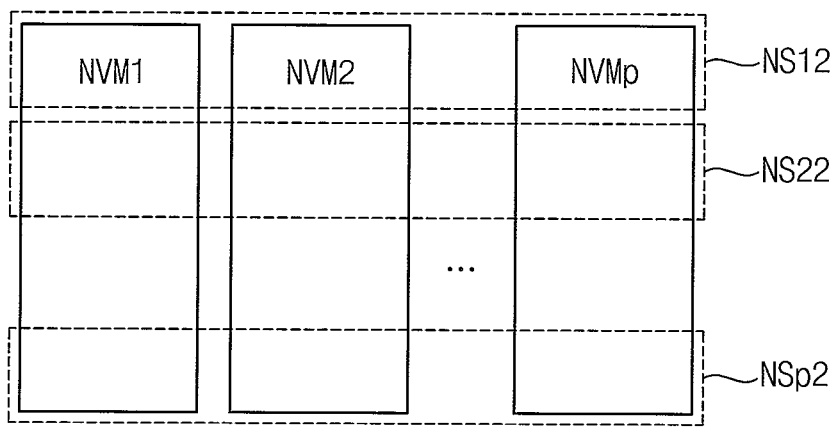

FIGS. 6A and 6B are diagrams for describing logical storage spaces that are set on nonvolatile memories included in a storage device according to example embodiments.

For example, the storage device according to example embodiments may operate based on a nonvolatile memory express (NVMe) protocol, and may support a namespace function and/or a zoned namespace (ZNS) function. The NVMe may be an interface of a register level that performs a communication between a storage device such as a solid state drive (SSD) and host software. The NVMe may be based on a peripheral component interconnect express (PCIe) bus or a compute express link (CAL) bus, and may be an interface designed or, alternatively, optimized for a SSD. When the namespace function is used, a storage device implemented with one physical device may be partitioned into a plurality of logical devices (e.g., a plurality of namespaces), and data may be managed based on the plurality of namespaces. When the zoned namespace function is used, one namespace may be additionally partitioned into a plurality of zones, and data may be managed based on the plurality of namespaces and the plurality of zones. All of the plurality of namespaces and the plurality of zones may be physically included in the same storage device, and each namespace and each zone may be used as a separate storage space.

Hereinafter, example embodiments will be described based on an example where each logical storage space includes a namespace. However, example embodiments are not limited thereto, the storage device may operate based on various protocols, and the logical storage space may be implemented in various manners, such as a logical block address (LBA) range.

Referring to FIG. 6A, an example of generating and setting a plurality of namespaces NS11, NS21, . . . , NSp1 on a plurality of nonvolatile memories NVM1, NVM2, ..., NVMp is illustrated, where p is a natural number greater than or equal to two. For example, the plurality of nonvolatile memories NVM1 to NVMp may be included in one storage device, and thus the plurality of namespaces NS11 to NSp1 may also be included in one storage device.

In the example of FIG. 6A, one namespace may be generated and set on one nonvolatile memory. For example, the namespace NS11 may be generated and set on the entire region of the nonvolatile memory NVM1 and the namespace NS21 may be generated and set on the entire region of the nonvolatile memory NVM2.

Referring to FIG. 6B, another example of generating and setting a plurality of namespaces NS12, NS22, ..., NSp2 on a plurality of nonvolatile memories NVM1, NVM2, ..., NVMp is illustrated. The descriptions repeated with FIG. 6A will be omitted.

In the example of FIG. 6B, one namespace may be generated and set on all of the plurality of nonvolatile memories NVM1 to NVMp. For example, the namespace NS12 may be generated and set on some regions of all of the plurality of nonvolatile memories NVM1 to NVMp and the namespace NS22 may be generated and set on some regions of all of the plurality of nonvolatile memories NVM1 to NVMp.

The operation of generating and setting the namespaces may be variously implemented according to example embodiments. For example, the capacities of the namespaces NS11 to NSp1 and NS12 to NSp2 may be substantially the same as or different from each other. For example, the number of namespaces NS11 to NSp1 and NS12 to NSp2 and the number of nonvolatile memories NVM1 to NVMp may be substantially the same as or different from each other.

Figure 7:
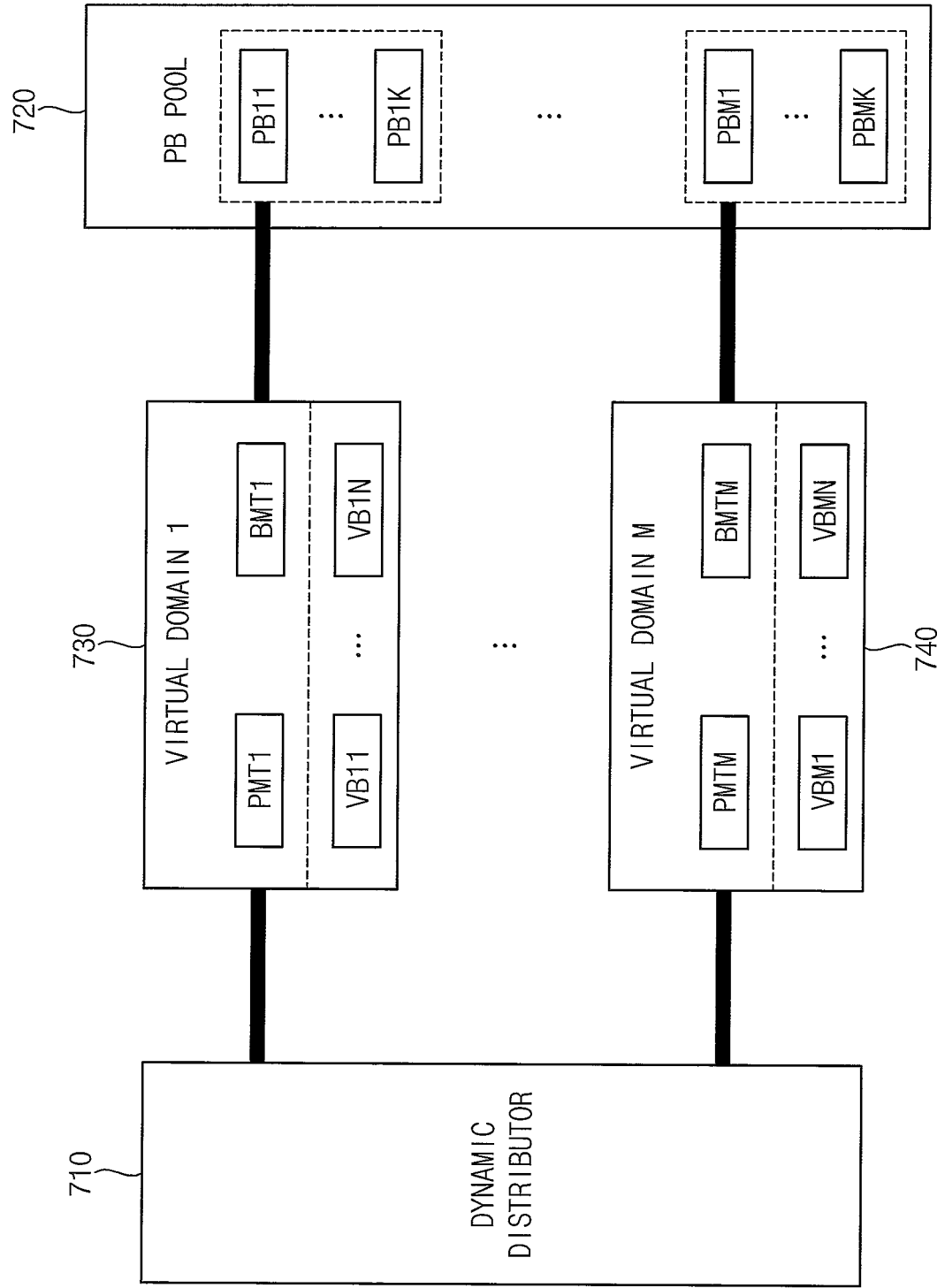

FIGS. 7, 8A and 8B are diagrams for describing a method of operating a storage device according to example embodiments.

Referring to FIG. 7, an example of a plurality of virtual domains 730 and 740 is illustrated.

A first virtual domain 730 may include a first page mapping table PMT1, a first block mapping table BMT1 and first virtual blocks VB11, ..., VB1N. The number (or quantity) of the first virtual blocks VB11 to VB1N may be N, where N is a natural number greater than or equal to two. The first page mapping table PMT1 and the first block mapping table BMT1 may be substantially the same as the page mapping table PMT and the block mapping table BMT in FIG. 2, respectively.

Similarly, an M-th virtual domain 740 may include an M-th page mapping table PMTM, an M-th block mapping table BMTM and M-th virtual blocks VBM1, ..., VBMN, where M is a natural number greater than or equal to two. The number (or quantity) of the M-th virtual blocks VBM1 to VBMN may be N.

A physical block pool 720 may include a plurality of physical blocks PB11, ..., PB1K, ..., PBM1, ..., PBMK. The physical blocks PB11 to PB1K and PBM1 to PBMK may correspond to the memory blocks BLK1 to BLKz in FIG. 4.

At least one of the physical blocks PB11 to PB1K and PBM1 to PBMK may be allocated or assigned to one virtual domain. For example, K physical blocks PB11 to PB1K may be allocated to the first virtual domain 730, where K is a natural number greater than or equal to two. Similarly, K physical blocks PBM1 to PBMK may be allocated to the M-th virtual domain 740.

In some example embodiments, the number or capacity of virtual blocks included in one virtual domain may be substantially equal to the number or capacity of physical blocks allocated to one virtual domain. In other words, the number or capacity of virtual blocks included in one virtual domain may be different from the number or capacity of physical blocks allocated to one virtual domain. For example, the physical blocks allocated to one virtual domain may have a capacity larger than that of the virtual blocks included in one virtual domain, and thus over-provisioning (OP) may be applied or employed for performance improvement. As another example, the physical blocks allocated to one virtual domain may have a capacity smaller than that of the virtual blocks included in one virtual domain, and thus thin-provisioning may be applied or employed to efficiently use storage spaces.

In some example embodiments, one virtual domain may be implemented on or for one logical storage space (e.g., one namespace). In other example embodiments, a plurality of virtual domains may be implemented on or for one logical storage space.

Although FIG. 7 illustrates that the virtual domains 730 and 740 have the same configuration, example embodiments are not limited thereto. For example, the number or capacity of virtual blocks included in virtual domains may be different from each other. For example, the number or capacity of physical blocks allocated to virtual domains may be different from each other.

Referring to FIGS. 8A and 8B, an example of a page mapping table 750 and a block mapping table 760 included in one virtual domain is illustrated.

The page mapping table 750 may include a relationship between logical addresses LADDR1, LADDR2 and LADDR3, and virtual addresses VADDR1, VADDR2 and VADDR3. For example, the logical addresses LADDR1 to LADDR3 may include logical page numbers (LPNs). The virtual addresses VADDR1 to VADDR3 may include addresses of virtual blocks.

The block mapping table 760 may include a relationship between the virtual addresses VADDR1 to VADDR3, and the physical addresses PADDR1, PADDR2 and PADDR3. For example, the physical addresses PADDR1 to PADDR3 may include physical block addresses (PBAs).

Although FIGS. 8A and 8B illustrate that the relationship between the addresses is formed as a table, example embodiments are not limited thereto. For example, the relationship between the addresses may be formed as various manners, such as a hash or a function, FIGS. 9 and 10 are flowcharts illustrating examples of generating a plurality of virtual domains in FIG. 1.

Figure 9:
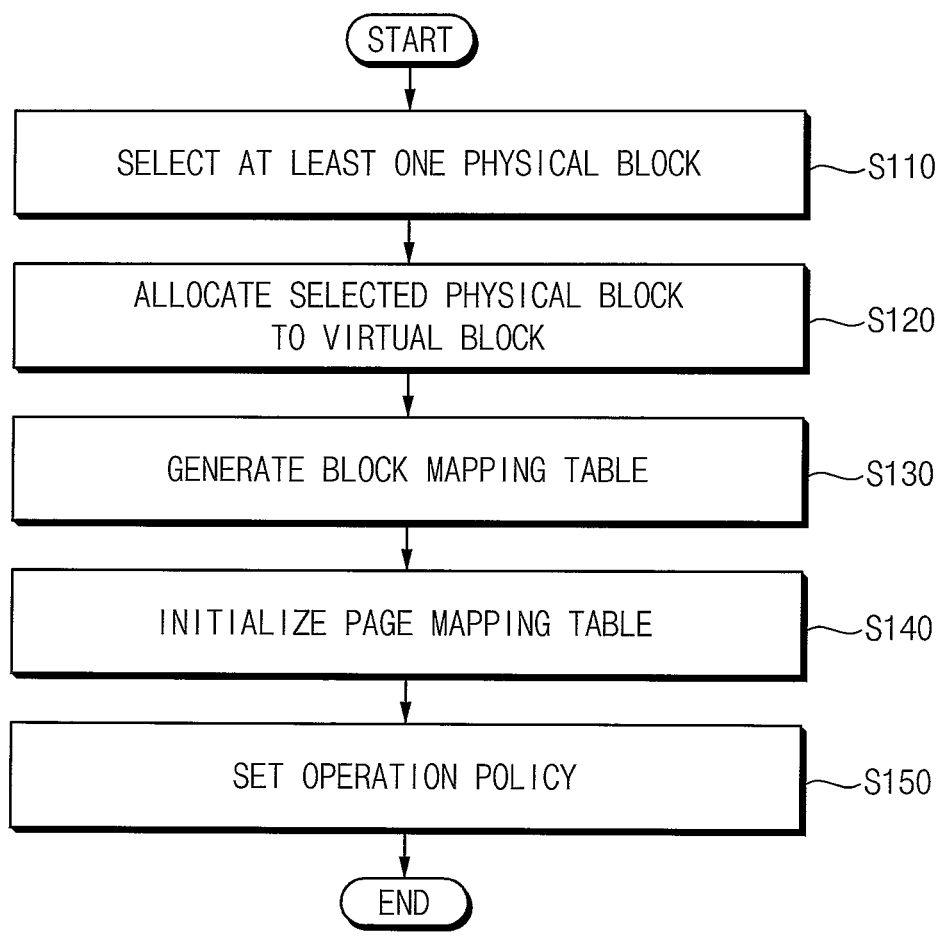
FIGS. 9 and 10 are flowcharts illustrating examples of generating a plurality of virtual domains in FIG. 1.
Figure 10:
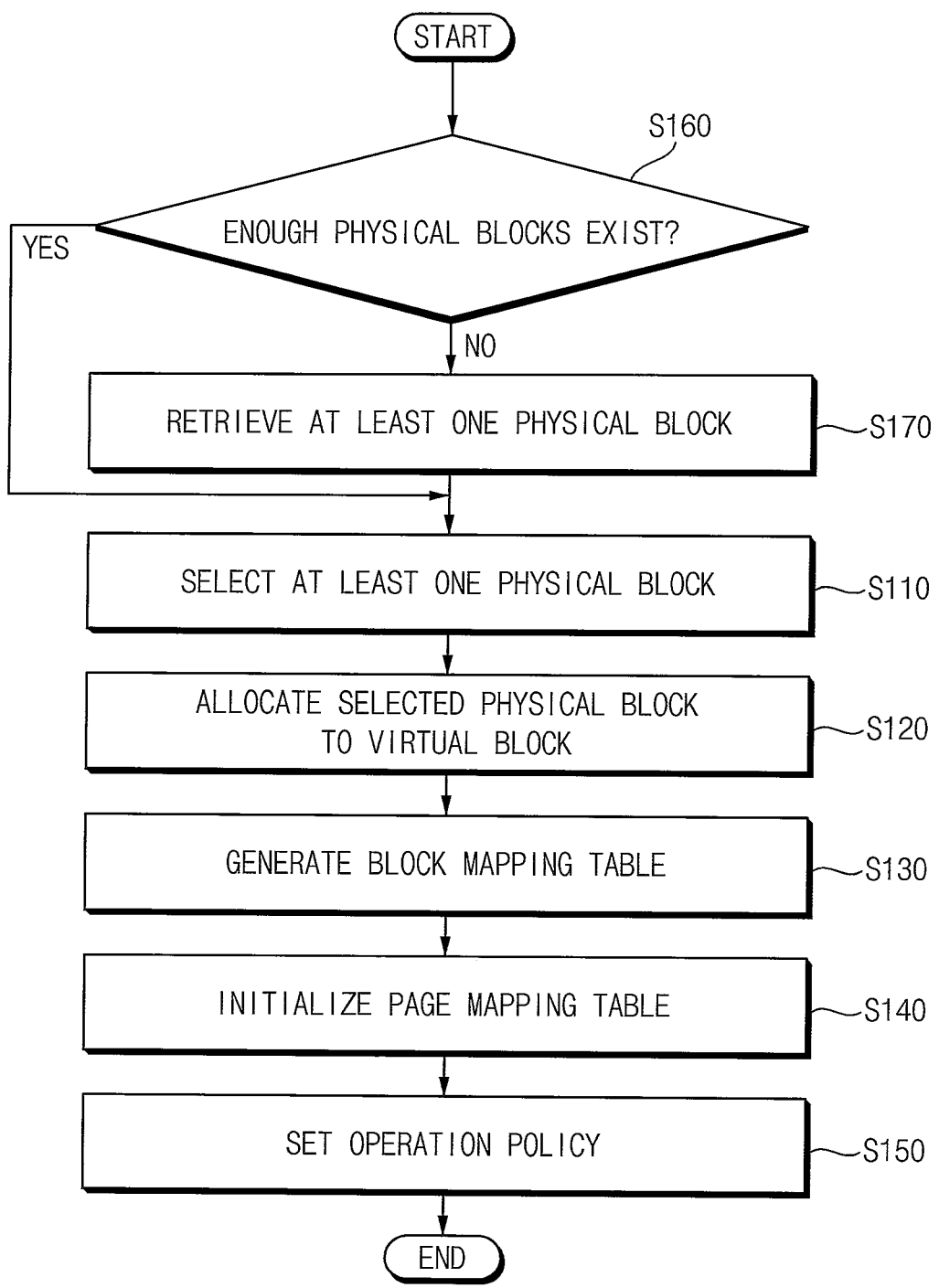

Referring to FIGS. 1, 7 and 9, an example of generating one virtual domain is illustrated, and an example where the first virtual domain 730 is generated will be described.

In step S100, at least one physical block to be allocated to the first virtual domain 730 may be selected from among the plurality of physical blocks PB11 to PB1K and PBM1 to PBMK that are included in the nonvolatile memories 320a to 320c (step S110). For example, the physical blocks PB11 to PB1K may be selected. For example, among the plurality of physical blocks PB11 to PB1K and PBM1 to PBMK of the physical block pool 720, at least one physical block that is not currently used (e.g., not allocated to other virtual domains) may be selected.

The first virtual blocks VB11 to VB1N included in the first virtual domain 730 may be implemented or formed, and the physical blocks PB11 to PB1K selected in step S110 may be allocated to the first virtual blocks VB11 to VB1N (step S120).

The first block mapping table BMT1 that is included in the first virtual domain 730 may be generated (step S130). The first page mapping table PMT1 that is included in the first virtual domain 730 and corresponds to the first block mapping table BMT1 may be initialized (step S140).

An operation policy of the first virtual domain 730 may be set (step S150). The operation policy may include a condition, a logic, an algorithm and/or a criterion for selecting the first virtual domain 730. For example, the operation policy of the first virtual domain 730 may be set and stored in the dynamic distributor 710, and thus the preparation to use the first virtual domain 730 may be completed.

Referring to FIGS. 1, 7 and 10, an example of generating one virtual domain is illustrated. The descriptions repeated with FIG. 9 will be omitted.

In step S100, before the at least one physical block to be allocated to the first virtual domain 730 is selected, it may be checked or determined whether enough or sufficient physical blocks to be allocated to the first virtual domain 730 exist in the physical block pool 720 (step S160).

When there are not enough physical blocks to be allocated to the first virtual domain 730 in the physical block pool 720 (step S160: NO), e.g., when all physical blocks are in use or allocated to other virtual domains, at least one physical block may be retrieved from another virtual domain (e.g., from a second virtual domain different from the first virtual domain 730) (step S170). After that, steps S110, S120, S130, S140 and S150 described with reference to FIG. 9 may be performed, and the physical block selected in step S110 may be the physical block retrieved in step S170.

When there are enough physical blocks to be allocated to the first virtual domain 730 in the physical block pool 720 (step S160: YES), step S170 may not be performed, and steps S110, S120, S130, S140 and S150 may be performed as described with reference to FIG. 9.

Figure 11:
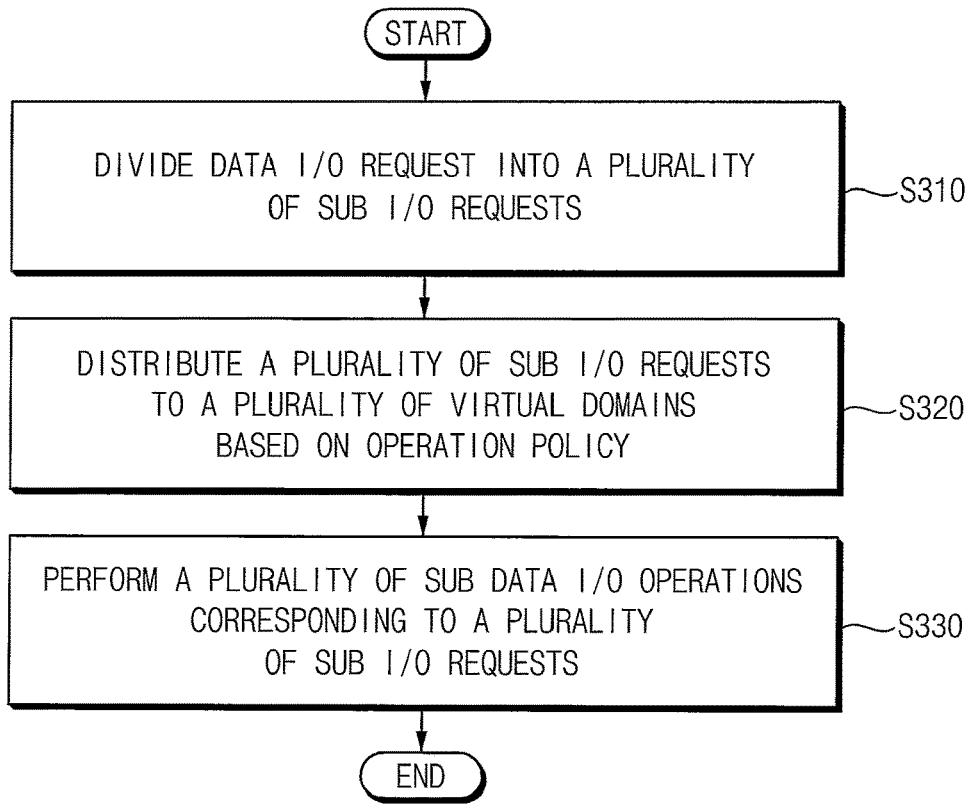
FIG. 11 is a flowchart illustrating an example of performing a data input/output (I/O) operation in FIG. 1.

FIG. 11 is a flowchart illustrating an example of performing a data I/O operation in FIG. 1.

Referring to FIGS. 1 and 11, in step S300, the data I/O request received in step S200 may be divided into a plurality of sub I/O requests (step S310). The plurality of sub I/O requests may be distributed to the plurality of virtual domains based on the operation policy of the plurality of virtual domains (step S320). A plurality of sub data I/O operations corresponding to the plurality of sub I/O requests may be performed (step S330).

Figure 12:
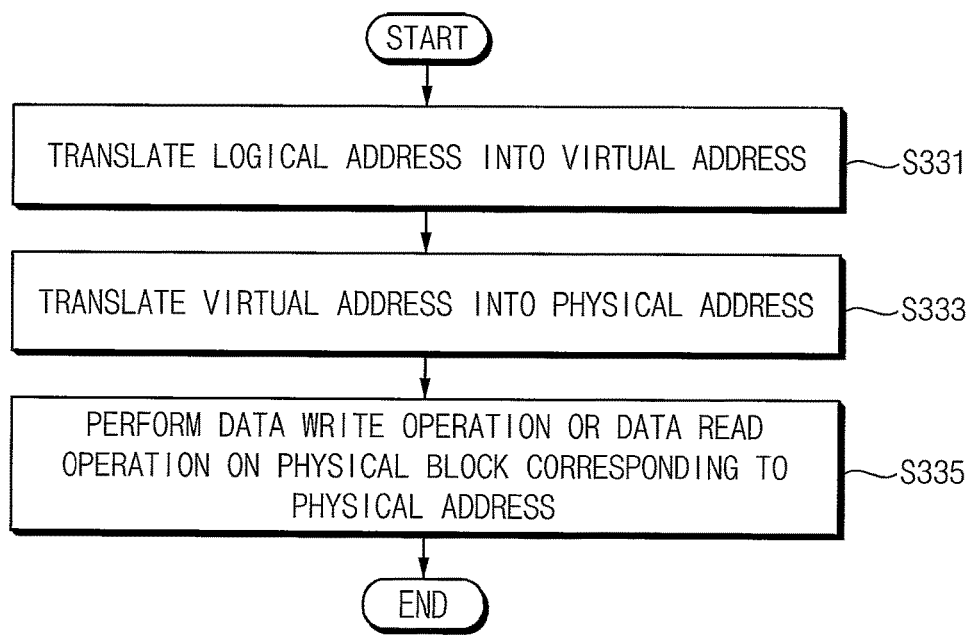
FIG. 12 is a flowchart illustrating an example of performing a plurality of sub data I/O operations in FIG. 11.

FIG. 12 is a flowchart illustrating an example of performing a plurality of sub data I/O operations in FIG. 11.

Referring to FIGS. 11 and 12, an example of performing one sub data I/O operation is illustrated, and an example where a first sub I/O request distributed to the first virtual domain 730 is performed will be described.

In step S330, a first logical address included in the first sub I/O request may be translated into a first virtual address based on the first page mapping table PMT1 (step S331). The first virtual address may be translated into a first physical address based on the first block mapping table BMT1 (step S333). A data write operation or a data read operation may be performed on a first physical block corresponding to the first physical address (step S335).

Figure 13A:
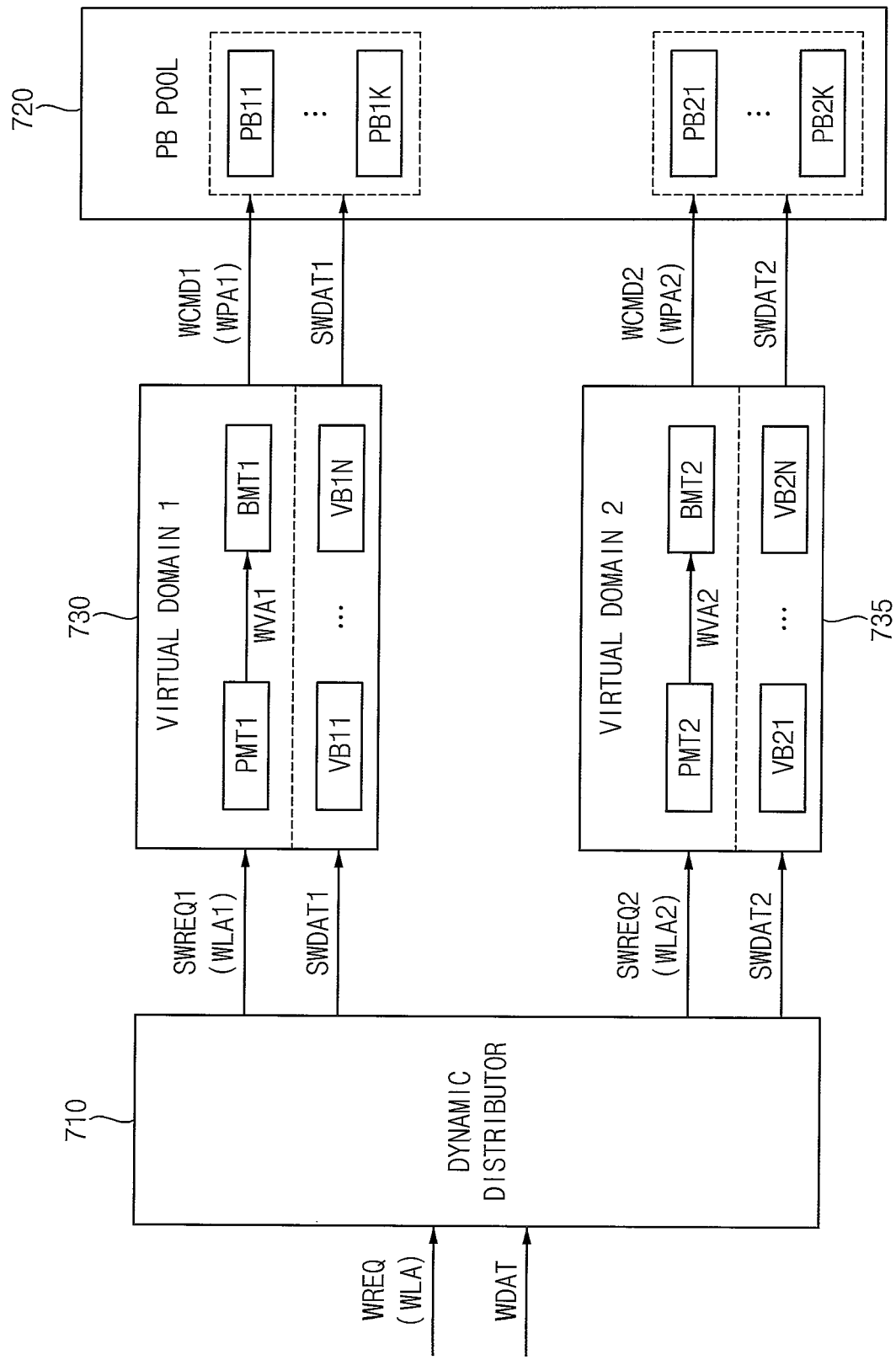
FIGS. 13A and 13B are diagrams for describing operations of FIGS. 11 and 12.
Figure 13B:
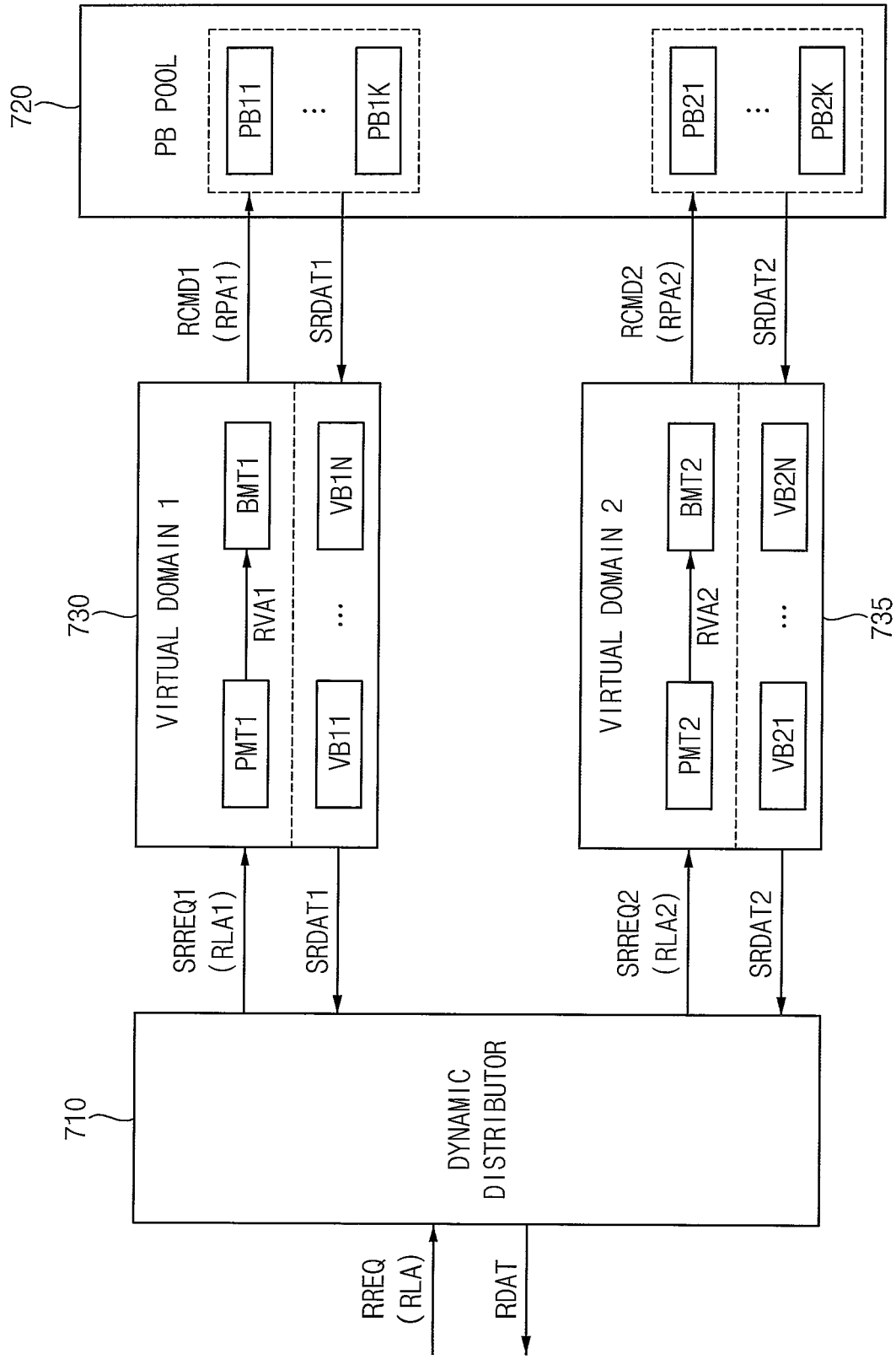

FIGS. 13A and 13B are diagrams for describing operations of FIGS. 11 and 12.

Referring to FIG. 13A, an example where the data I/O request includes a data write request WREQ is illustrated. In FIG. 13A, the first virtual domain 730 that includes the first page mapping table PMT1, the first block mapping table BMT1 and the first virtual blocks VB11 to VB1N may generated, and a second virtual domain 735 that includes a second page mapping table PMT2, a second block mapping table BMT2 and second virtual blocks VB21, . . . , VB2N may be generated.

The data write request WREQ and write data WDAT that are received from the host device 200 may be provided to the dynamic distributor 710. The data write request WREQ may include logical write addresses WLA.

The dynamic distributor 710 may divide the data write request WREQ into first and second sub data write requests SWREQ1 and SWREQ2 based on an operation policy of the first and second virtual domains 730 and 735. For example, the logical write addresses WLA may be divided into first and second logical write addresses WLA1 and WLA2, and the write data WDAT may be divided into first and second write data SWDAT1 and SWDAT2.

The first sub data write request SWREQ1 including the first logical write address WLA1 and the first write data SWDAT1 may be provided to the first virtual domain 730. In a data write operation, the first virtual domain 730 may map the first logical write address WLA1 to a first virtual write address WVA1 in the first page mapping table PMT1, and may map the first virtual write address WVA1 to a first physical write address WPA1 in the first block mapping table BMT1. After that, a first write command WCMD1 including the first physical write address WPA1 and the first write data SWDAT1 may be provided to the physical blocks PB11 to PB1K allocated to the first virtual domain 730, and the first write data SWDAT1 may be stored in the physical blocks PB11 to PB1K.

Similarly, the second sub data write request SWREQ2 including the second logical write address WLA2 and the second write data SWDAT2 may be provided to the second virtual domain 735. The second virtual domain 735 may map the second logical write address WLA2 to a second virtual write address WVA2 in the second page mapping table PMT2, and may map the second virtual write address WVA2 to a second physical write address WPA2 in the second block mapping table BMT2. After that, a second write command WCMD2 including the second physical write address WPA2 and the second write data SWDAT2 may be provided to the physical blocks PB21 to PB2K allocated to the second virtual domain 735, and the second write data SWDAF2 may be stored in the physical blocks PB21 to PB2K.

Referring to FIG. 13B, an example where the data I/O request includes a data read request RREQ is illustrated. The descriptions repeated with FIG. 13A will be omitted.

The data read request RREQ that is received from the host device 200 and includes logical read addresses RLA may be provided to the dynamic distributor 710.

The dynamic distributor 710 may divide the data read request RREQ into first and second sub data read requests SRREQ1 and SRREQ2 based on the operation policy of the first and second virtual domains 730 and 735. For example, the logical read addresses RLA may be divided into first and second logical read addresses RLA1 and RLA2.

The first sub data read request SRREQ1 including the first logical read address RLA1 may be provided to the first virtual domain 730. In a data read operation, the first virtual domain 730 may first translate the first logical read address RLA1 into a first virtual read address RVA1 based on the first page mapping table PMT1, and then may second translate the first virtual read address RVA1 into a first physical read address RPA1 based on the first block mapping table BMT1. After that, a first read command RCMD1 including the first physical read address RPA1 may be provided to the physical blocks PB11 to PB1K, and the first read data SRDAT1 may be read from the physical blocks PB11 to PB1K. The first read data SRDAT1 may be provided to the dynamic distributor 710 and then to a host device.

Similarly, the second sub data read request SRREQ2 including the second logical read address RLA2 may be provided to the second virtual domain 735. The second virtual domain 735 may first translate the second logical read address RLA2 into a second virtual read address RVA2 based on the second page mapping table PMT2, and then may second translate the second virtual read address RVA2 into a second physical read address RPA2 based on the second block mapping table BMT2. After that, a second read command RCMD2 including the second physical read address RPA2 may be provided to the physical blocks PB21 to PB2K, and the second read data SRDAT2 may be read from the physical blocks PB21 to PB2K. The second read data SRDAT2 may be provided to the dynamic distributor 710 and then to a host device.

Figure 14:
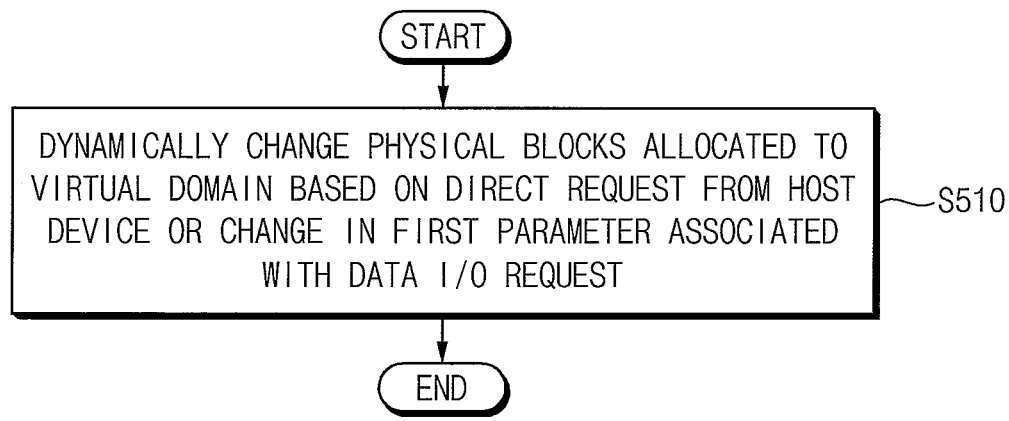
FIG. 14 is a flowchart illustrating an example of dynamically changing at least one of a plurality of virtual domains in FIG. 1.

FIG. 14 is a flowchart illustrating an example of dynamically changing at least one of a plurality of virtual domains in FIG. 1.

Referring to FIGS. 1 and 14, in step S500, physical blocks allocated to a virtual domain may be dynamically changed based on the direct request from the host device or the change in the first parameter associated with the data I/O request (step S510). For example, the number (or quantity) of physical blocks allocated to a specific virtual domain may be increased or decreased.

As described with reference to FIG. 1, the first parameter may include at least one of the workload, the performance requirement and the QoS requirement associated with each of the plurality of virtual domains. The workload may represent the amount or quantity of data I/O requests for a specific virtual domain. The performance requirement may include an operating speed of a specific virtual domain, or the like. The QoS requirement may represent the consistency and predictability of latency (or response time) and input/outputs per second (IOPS) performance while write/read workloads are serviced for a specific virtual domain.

Figure 15:
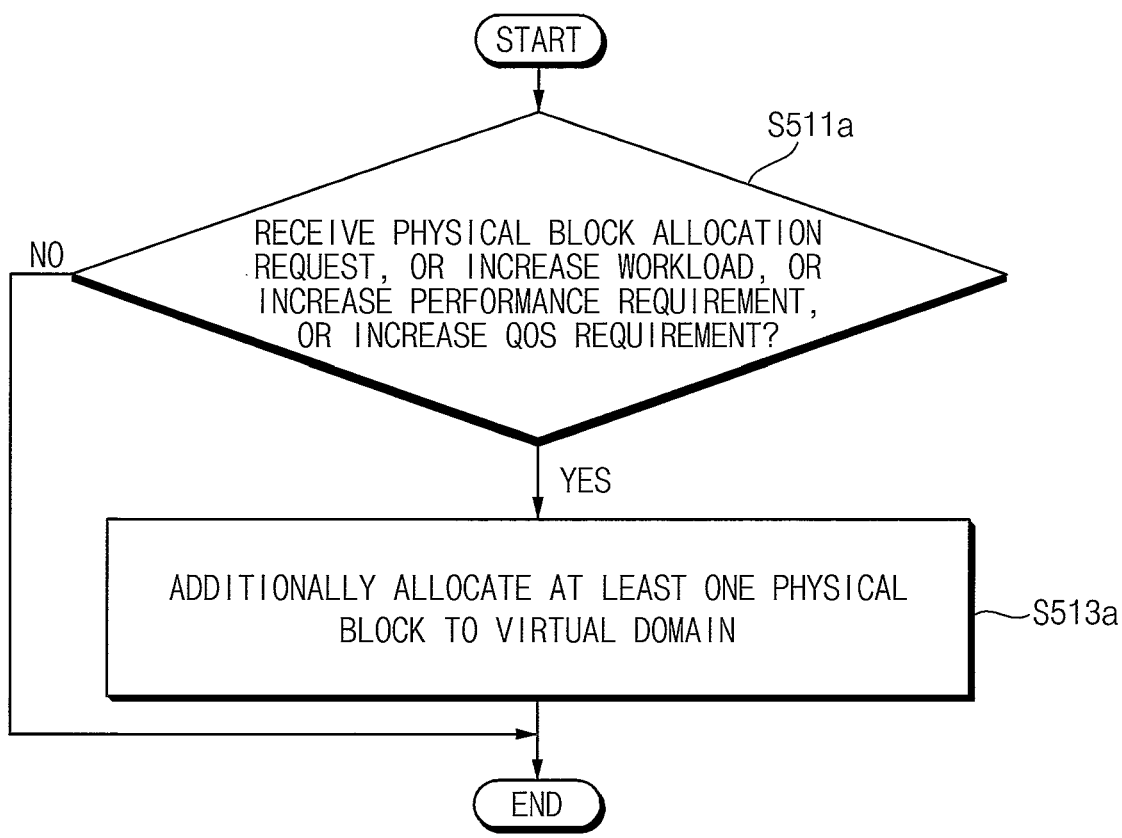
FIG. 15 is a flowchart illustrating an example of dynamically changing physical blocks in FIG. 14.
Figure 16:
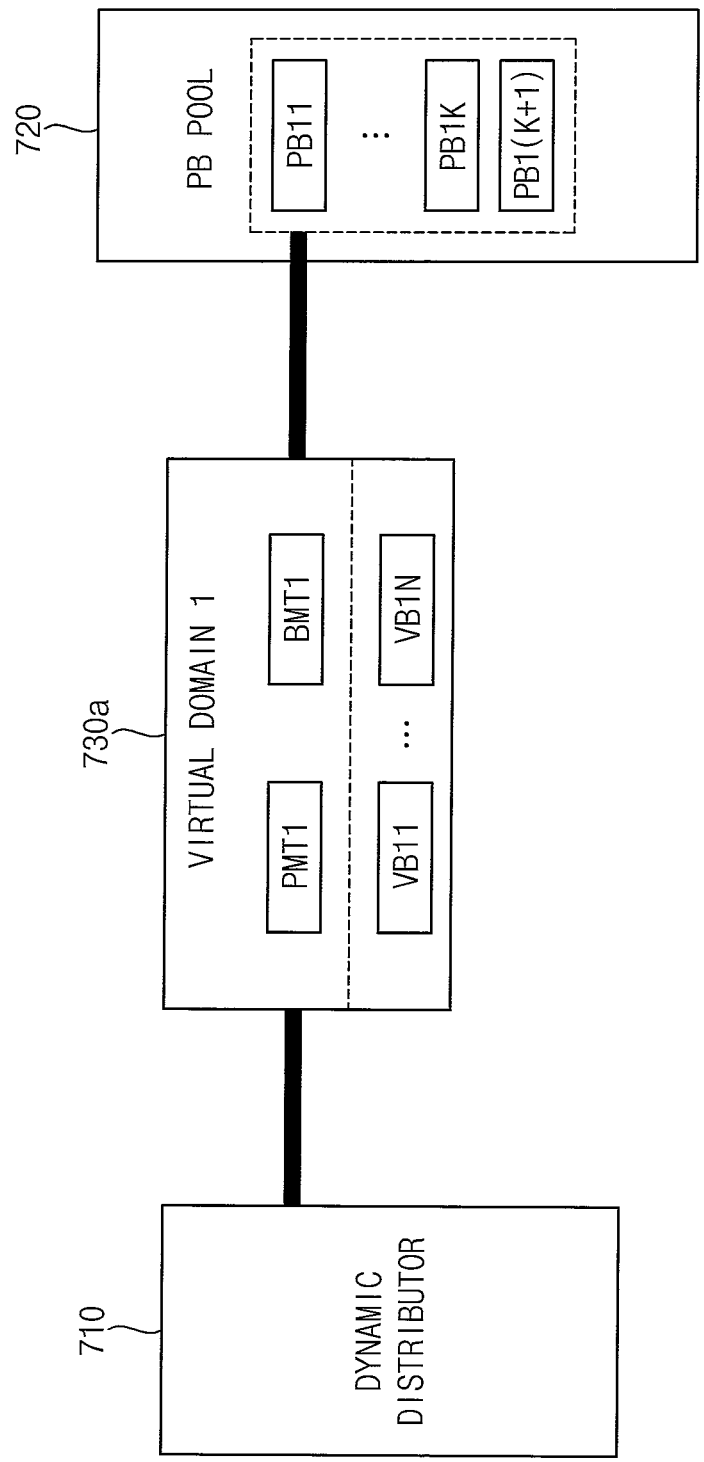
FIG. 16 is a diagram for describing an operation of FIG. 15.

FIG. 15 is a flowchart illustrating an example of dynamically changing physical blocks in FIG. 14. FIG. 16 is a diagram for describing an operation of FIG. 15.

Referring to FIGS. 14, 15 and 16, an example of changing physical blocks allocated to one virtual domain is illustrated, and an example where the physical blocks PB11 to PB1K allocated to the first virtual domain 730 are changed will be described.

In step S510, when a physical block allocation request is received from the host device 200, or when a workload associated with the first virtual domain 730 is increased and becomes greater than a first reference workload, or when a performance requirement associated with the first virtual domain 730 is increased and becomes higher than a first reference performance, or when a QoS requirement associated with the first virtual domain 730 is increased and becomes higher than a first reference QoS (step S511a: YES), at least one physical block may be additionally allocated to the first virtual domain 730 (step S513a).

For example, when at least one of the conditions in step S511a is satisfied while the first virtual domain 730 is implemented as illustrated in FIG. 7, a first virtual domain 730a may be newly implemented (or updated) by additionally allocating the physical block PB1(K+1) to the first virtual domain 730 as illustrated in FIG. 16. For example, an unused physical block PB1(K+1) from the physical block pool 720 may be allocated to the first virtual domain 730a.

As described with reference to FIG. 5, the physical blocks included in the nonvolatile memory may be connected to a plurality of channels and a plurality of ways. In some example embodiments, as the physical block PB1(K+1) is additionally allocated, the number (or quantity) of channels and ways that are enabled or activated may be increased. In other words, a first quantity of channels and ways that are enabled while accessing the first virtual domain 730 to which the physical blocks PB11 to PB1K are allocated may be less than a second quantity of channels and ways that are enabled while accessing the first virtual domain 730a to which the physical blocks PB11 to PB1K are allocated and to which the physical block PB1(K+1) is additionally allocated. As described above, when the quantity of physical blocks PB11 to PB1(K+1) allocated to the first virtual domain 730a is increased, and when the quantity of channels and ways that are enabled while accessing the first virtual domain 730a is increased, the first virtual domain 730a may handle a relatively large workload or may satisfy a relatively high performance requirement and/or QoS requirement.

Figure 17:
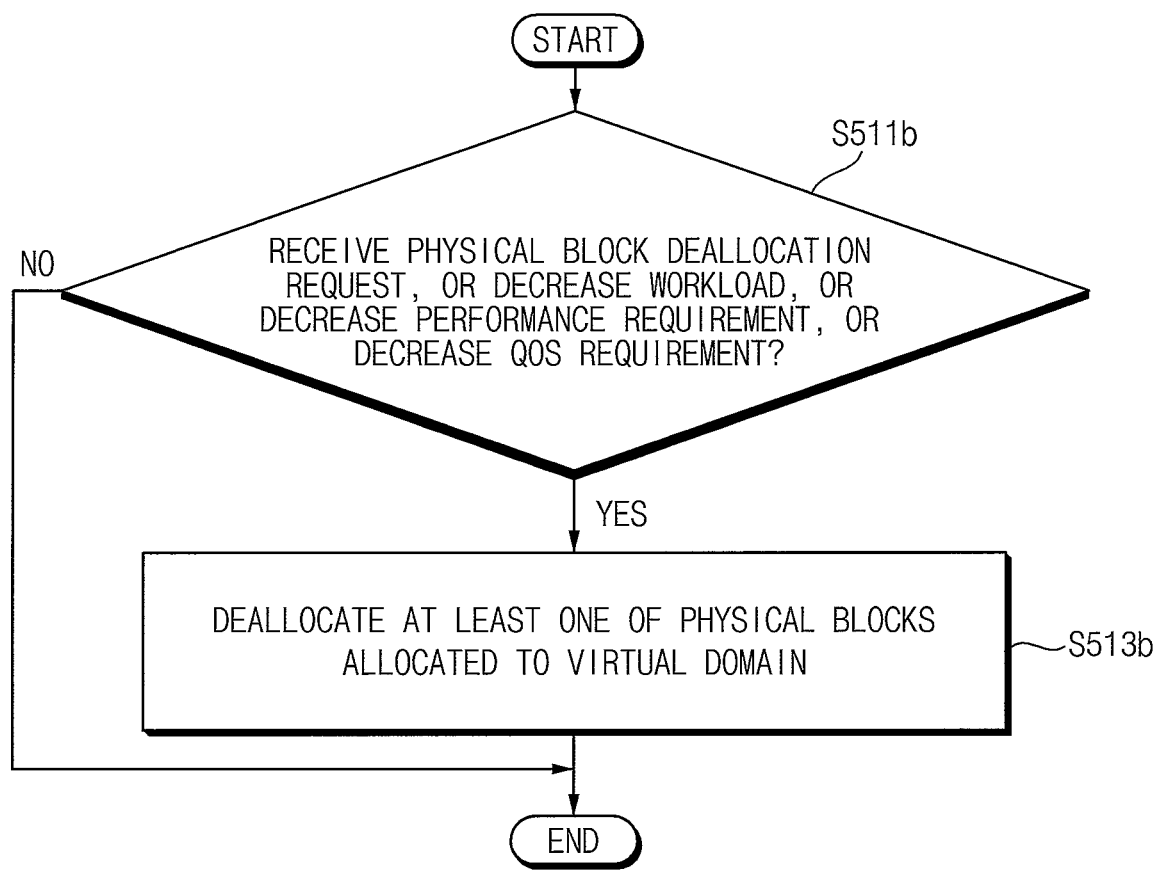
FIG. 17 is a flowchart illustrating another example of dynamically changing physical blocks in FIG. 14.
Figure 18:
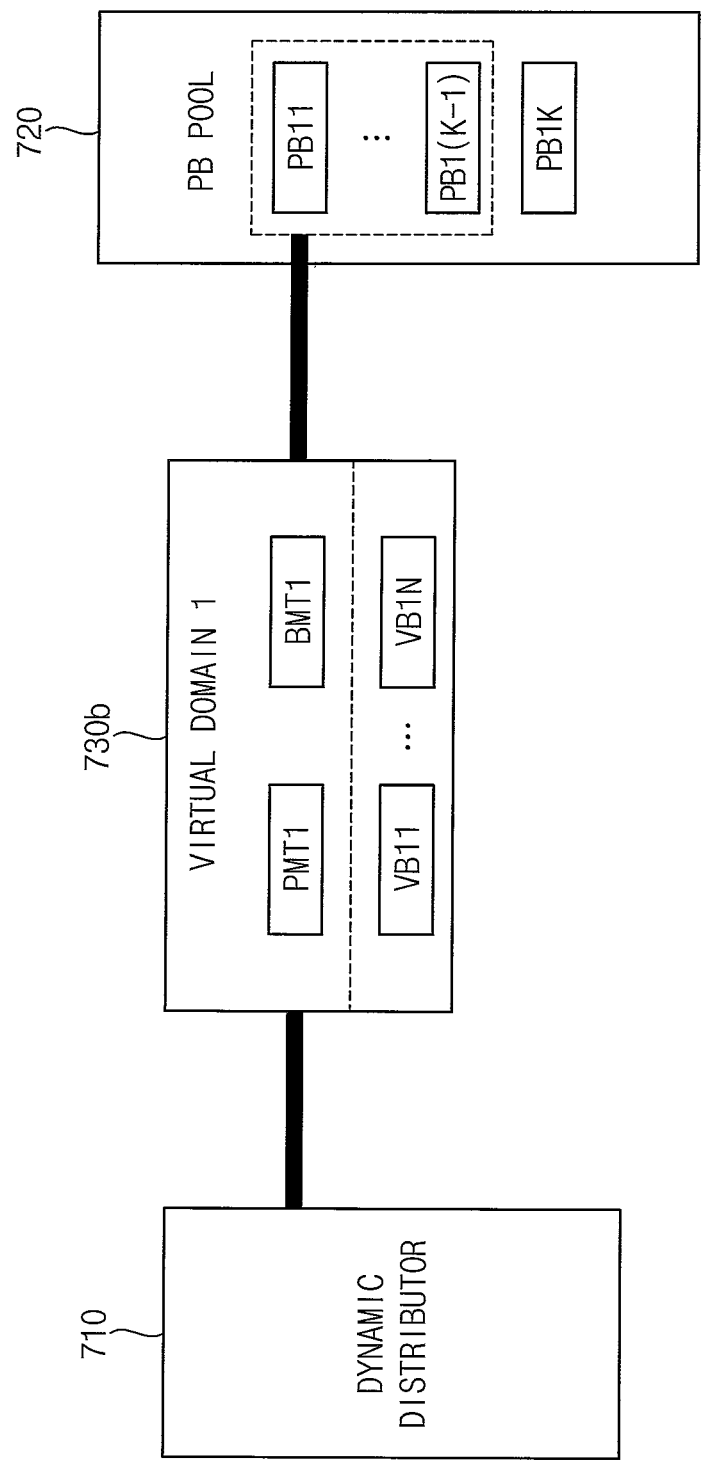
FIG. 18 is a diagram for describing an operation of FIG. 17.

FIG. 17 is a flowchart illustrating another example of dynamically changing physical blocks in FIG. 14. FIG. 18 is a diagram for describing an operation of FIG. 17.

Referring to FIGS. 14, 17 and 18, an example of changing physical blocks allocated to one virtual domain is illustrated, and an example where the physical blocks PB11 to PB1K allocated to the first virtual domain 730 are changed will be described.

In step S510, when a physical block deallocation request is received from the host device 200, or when the workload associated with the first virtual domain 730 is decreased and becomes less than a second reference workload, or when the performance requirement associated with the first virtual domain 730 is decreased and becomes lower than a second reference performance, or when the QoS requirement associated with the first virtual domain 730 is decreased and becomes lower than a second reference QoS (step S511b: YES), at least one of the physical blocks PB11 to PB1K allocated to the first virtual domain 730 may be deallocated (step S513b). For example, the second reference workload, the second reference performance and the second reference QoS may be different from the first reference workload, the first reference performance and the first reference QoS in FIG. 15.

For example, when at least one of the conditions in step S511b is satisfied while the first virtual domain 730 is implemented as illustrated in FIG. 7, a first virtual domain 730b to which only physical blocks PB11, . . . , PB1(K−1) are allocated may be newly implemented by deallocating the physical block PB1K from the first virtual domain 730 as illustrated in FIG. 18.

In some example embodiments, as the physical block PB1K is deallocated, the number (or quantity) of channels and ways that are enabled or activated may be decreased. In other words, a first quantity of channels and ways that are enabled while accessing the first virtual domain 730 to which the physical blocks PB11 to PB1K are allocated may be greater than a third quantity of channels and ways that are enabled while accessing the first virtual domain 730b from which the physical block PB1K among the physical blocks PB11 to PB1K is deallocated.

Figure 19:
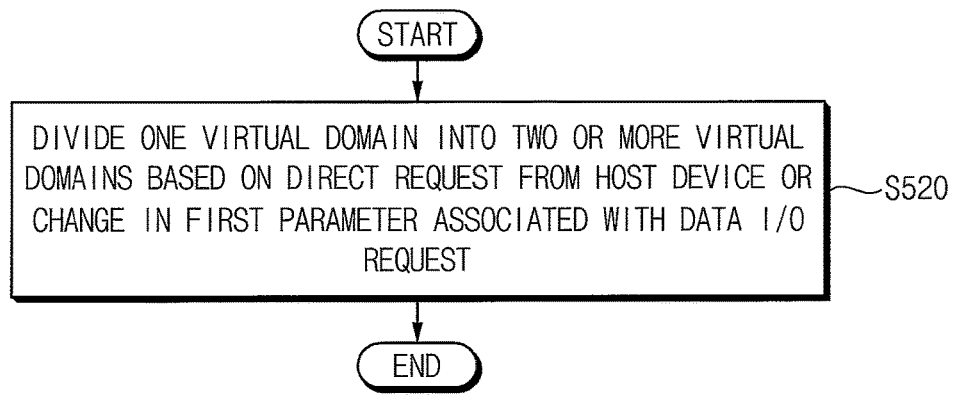
FIG. 19 is a flowchart illustrating another example of dynamically changing at least one of a plurality of virtual domains in FIG. 1.

FIG. 19 is a flowchart illustrating another example of dynamically changing at least one of a plurality of virtual domains in FIG. 1.

Referring to FIGS. 1 and 19, in step S500, one virtual domain may be divided or split into two or more virtual domains based on the direct request from the host device or the change in the first parameter associated with the data I/O request (step S520).

Figure 20:
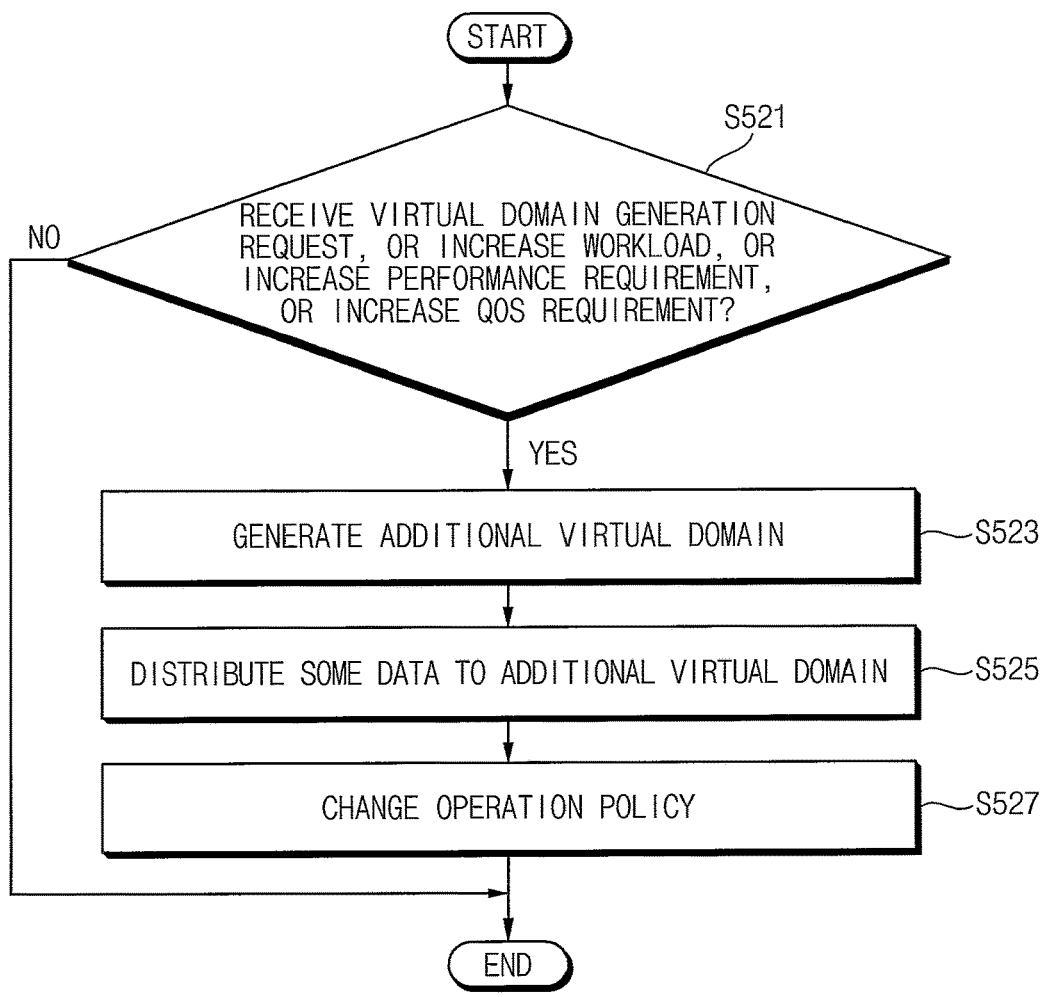
FIG. 20 is a flowchart illustrating an example of dividing one virtual domain into two or more virtual domains in FIG. 19.
Figure 21A:
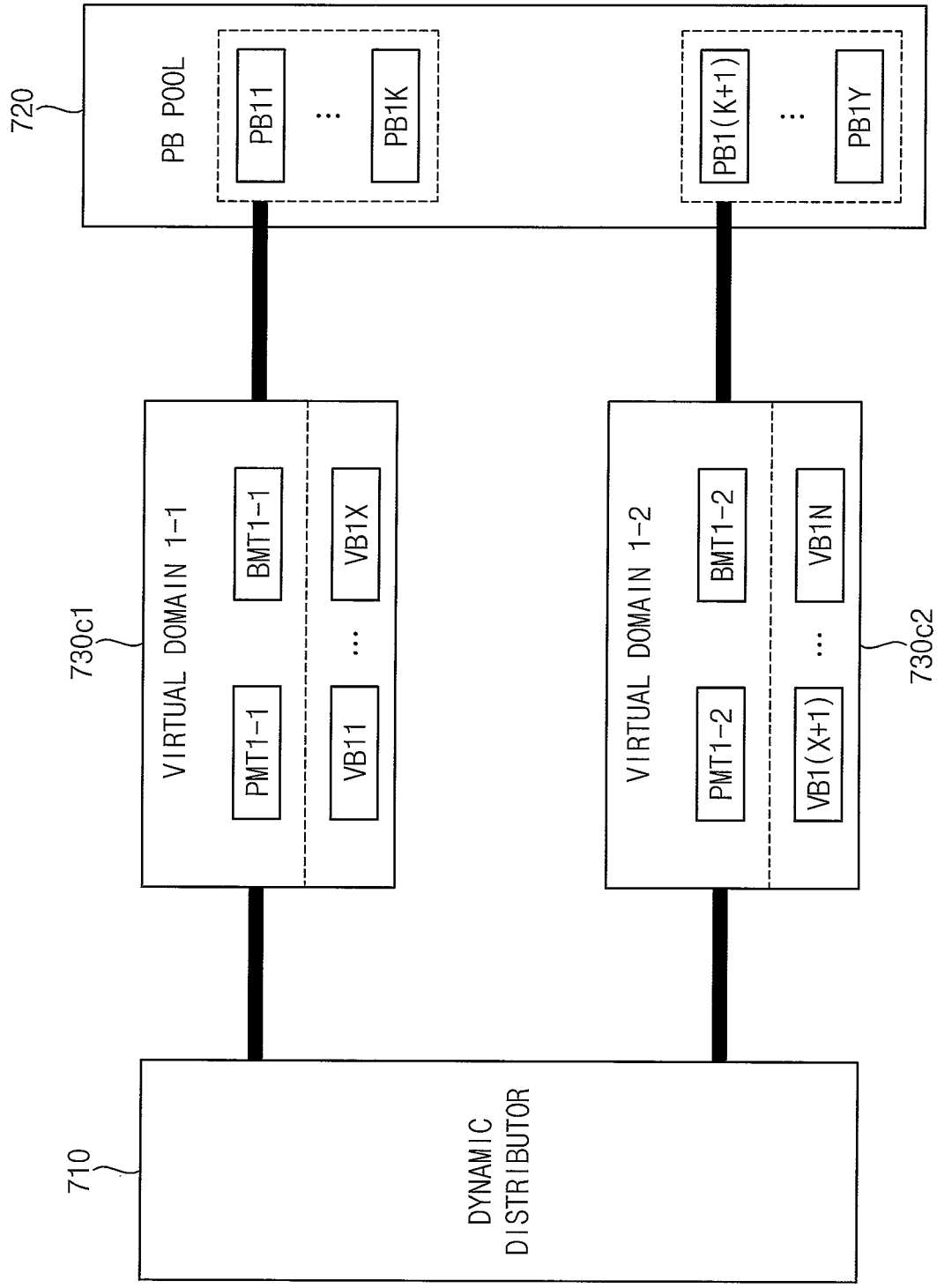
FIGS. 21A and 21B are diagrams for describing an operation of FIG. 20.
Figure 21B:
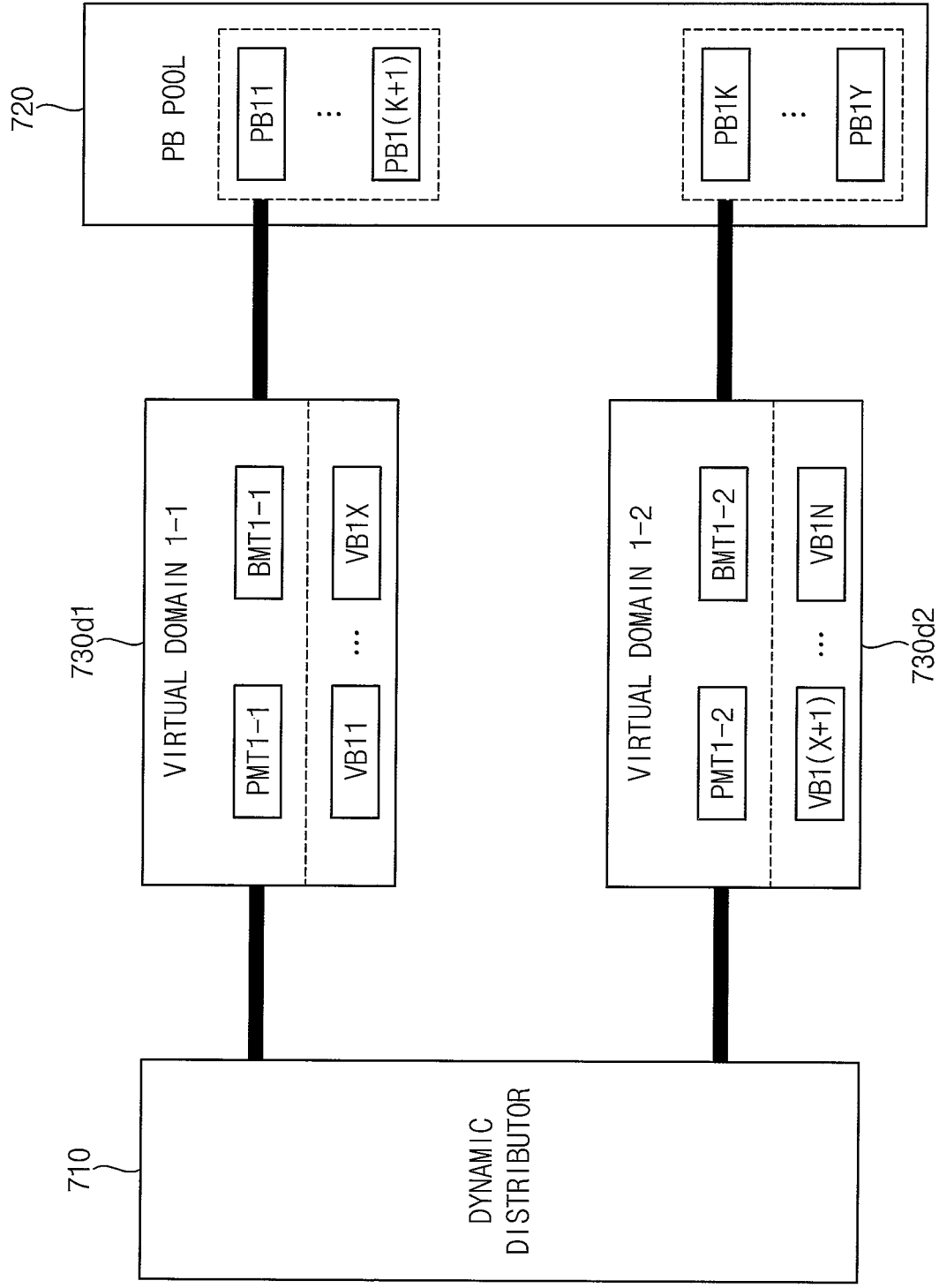

FIG. 20 is a flowchart illustrating an example of dividing one virtual domain into two or more virtual domains in FIG. 19. FIGS. 21A and 21B are diagrams for describing an operation of FIG. 20.

Referring to FIGS. 19, 20, 21A and 21B, an example where the first virtual domain 730 is divided into two virtual domains will be described. It is to be understood, however, that the first virtual domain may be divided into three or more virtual domains.

In step S520, when a virtual domain generation request is received from the host device 200, or when the workload associated with the first virtual domain 730 is increased and becomes greater than the first reference workload, or when the performance requirement associated with the first virtual domain 730 is increased and becomes higher than the first reference performance, or when the QoS requirement associated with the first virtual domain 730 is increased and becomes higher than the first reference QoS (step S521: YES), another (or additional) virtual domain different from the first virtual domain 730 may be generated (step S523). Some of data stored in the first virtual domain 730 may be distributed (or reconstructed) to the another virtual domain (step S525). The operation policy of the plurality of virtual domains may be changed (step S527). Step S521 may be similar to step S5111a in FIG. 15.

For example, when at least one of the conditions in step S521 is satisfied while the first virtual domain 730 is implemented as illustrated in FIG. 7, the first virtual domain 730 may be divided into a first-first virtual domain 730c1 and a first-second virtual domain 730c2. For example, the first-first virtual domain 730c1 may include some virtual blocks VB11, . . . , VB1X among the first virtual blocks VB11 to VB1N, where X is a natural number greater than one and less than N, and the physical blocks PB11 to PB1K may be allocated to the first-first virtual domain 730c1. The first-first virtual domain 730c1 may include a first-first page mapping table PMT1-1 and a first-first block mapping table BMT1-1. The first-second virtual domain 730c2 may include the other virtual blocks VB1(X+1), . . . , VB1N among the first virtual blocks VB11 to VB1N, and the physical blocks PB1(K+1), . . . , PB1Y may be allocated to the first-second virtual domain 730c2, where Y is a natural number greater than K. The first-second virtual domain 730c2 may include a first-second page mapping table PMT1-2 and a first-second block mapping table BMT1-2. Based on the separation of virtual domains, the mapping tables PMT1-1, PMT1-2, BMT1-1 and BMT1-2 may be appropriately generated and/or updated.

In addition, some of data stored in the physical blocks PB11 to PB1K allocated to the first virtual domain 730 may be distributed or copied to the physical blocks PB1(K+1) to PB1Y allocated to the first-second virtual domain 730c2 that is the newly generated virtual domain. For example, data stored in the physical block PB1K may be distributed or copied to the physical block PB1(K+1). Further, a new operation policy may be applied in the dynamic distributor 710, the service may be tried first on the new virtual domain and then processed by the existing virtual domain. Thus, the dynamic distributor 710 may be optimized to enable simultaneous service during data distribution or a copying process.

In some example embodiments, instead of distributing or copying the data stored in the physical block PB1K to the physical block PB1(K+1) as described with reference to FIG. 21A, the physical block PB1K and the physical block PB1(K+1) may be exchanged as illustrated in FIG. 21B. In this example, the physical blocks PB11 and PB1(K+1) may be finally allocated to a first-first virtual domain 730d1, and the physical blocks PB1K and PB1Y may be finally allocated to a first second virtual domain 730d2. Thus, although actual distribution or copying of data does not occur, the same result as if data distribution or copying is performed may be obtained.

Figure 22:
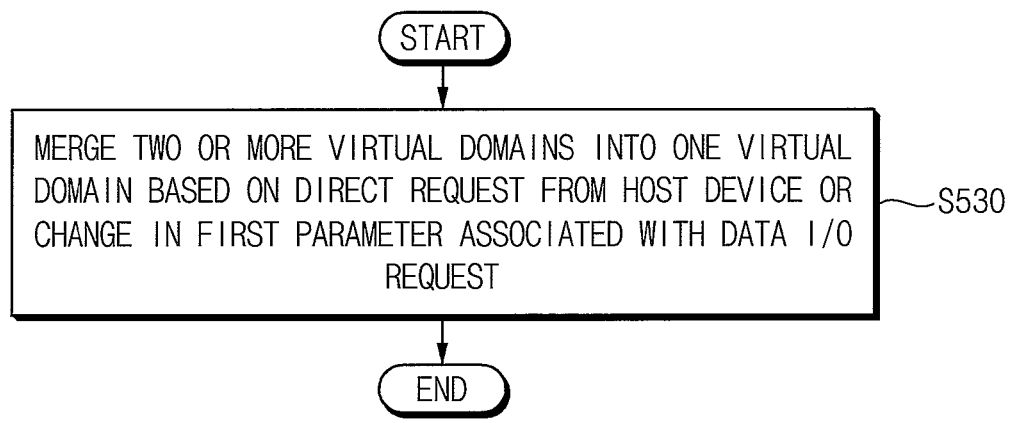
FIG. 22 is a flowchart illustrating still another example of dynamically changing at least one of a plurality of virtual domains in FIG. 1.

FIG. 22 is a flowchart illustrating still another example of dynamically changing at least one of a plurality of virtual domains in FIG. 1.

Referring to FIGS. 1 and 22, in step S500, two or more virtual domains may be merged or combined into one virtual domain based on the direct request from the host device or the change in the first parameter associated with the data I/O request (step S530).

Figure 23:
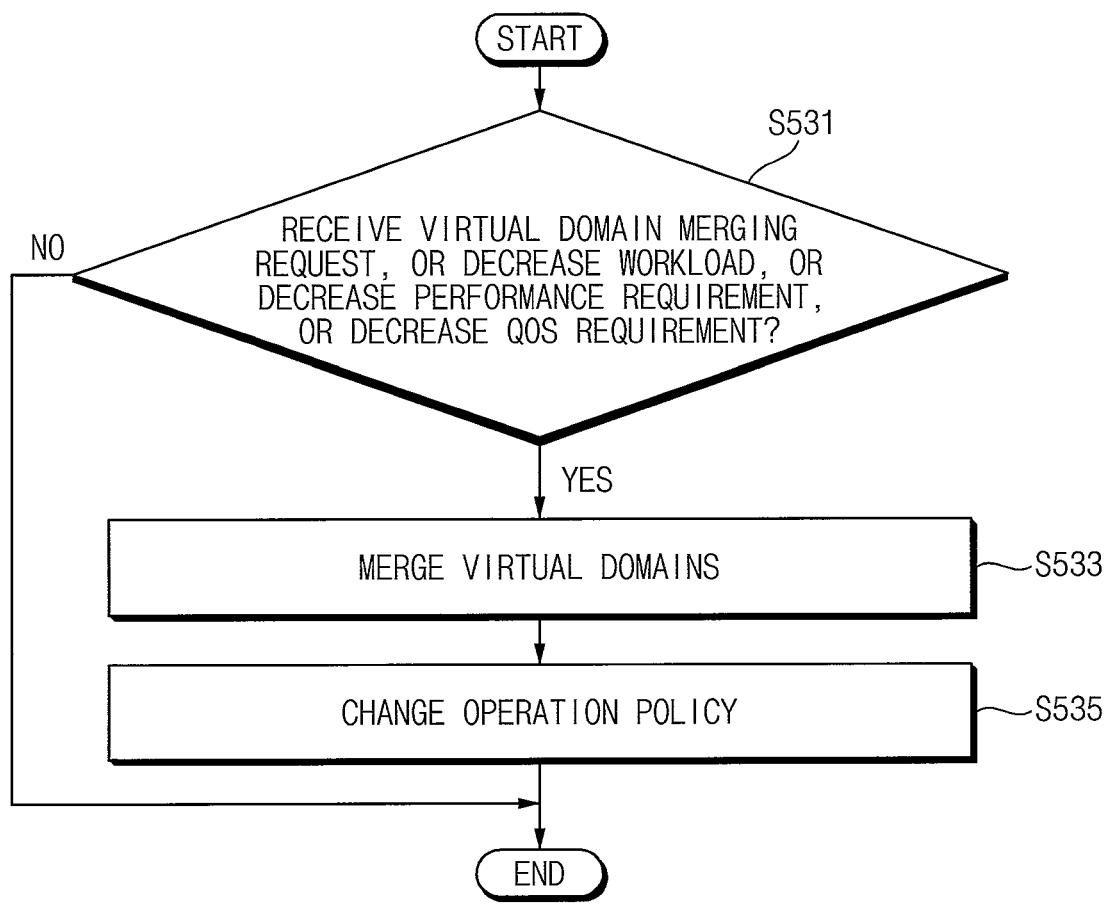
FIG. 23 is a flowchart illustrating an example of merging two or more virtual domains into one virtual domain in FIG. 22.
Figure 24A:
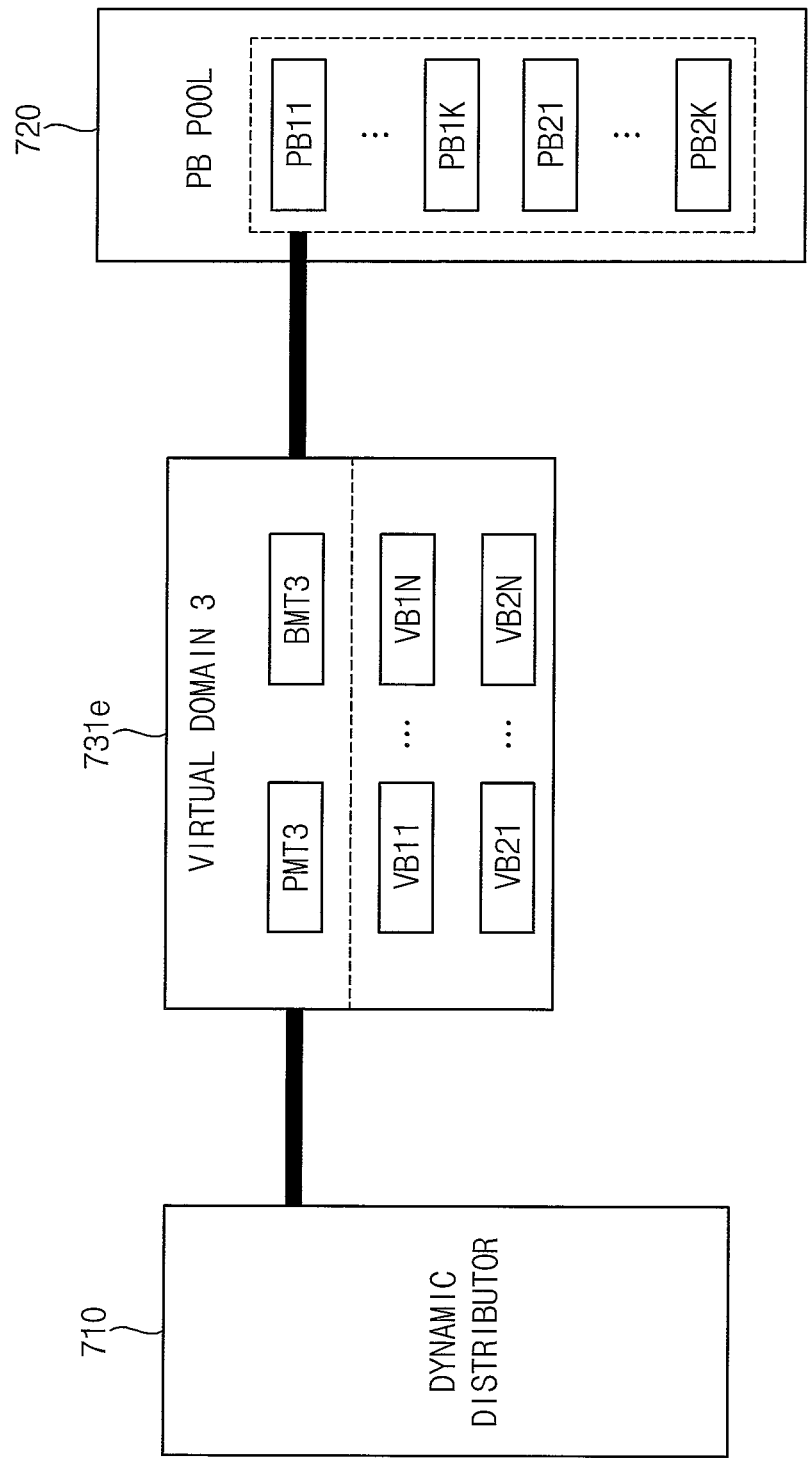
FIGS. 24A and 24B are diagrams for describing an operation of FIG. 23.
Figure 24B:
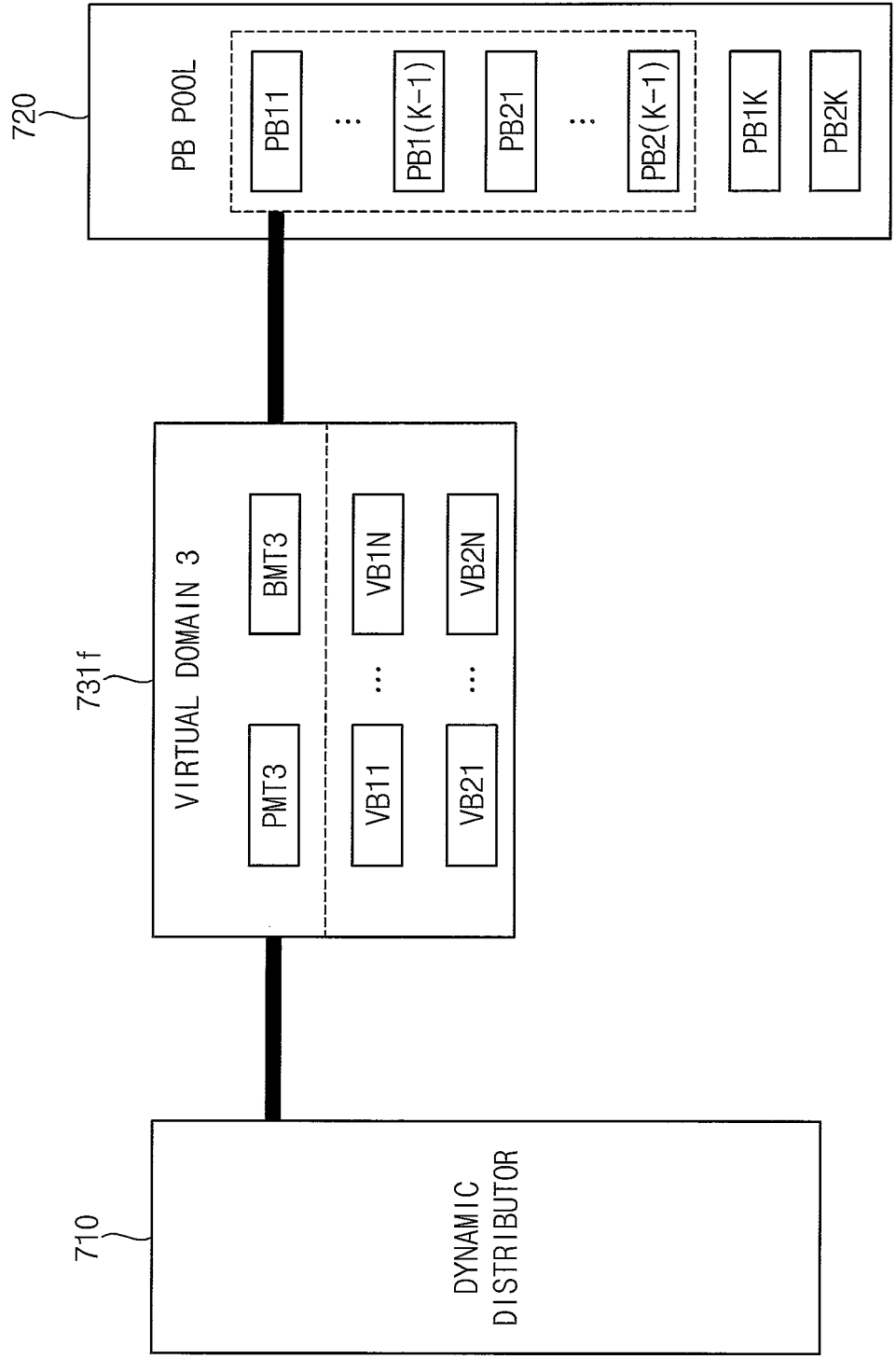

FIG. 23 is a flowchart illustrating an example of merging two or more virtual domains into one virtual domain in FIG. 22. FIGS. 24A and 24B are diagrams for describing an operation of FIG. 23.

Referring to FIGS. 22, 23, 24A and 24B, an example where the first and second virtual domains 730 and 735 are merged into one virtual domain will be described.

In step S530, when a virtual domain merging request is received from the host device 200, or when the workload associated with the first and second virtual domains 730 and 735 is decreased and becomes less than the second reference workload, or when the performance requirement associated with the first and second virtual domains 730 and 735 is decreased and becomes lower than the second reference performance, or when the QoS requirement associated with the first and second virtual domains 730 and 735 is decreased and becomes lower than the second reference QoS (step S531: YES), the first and second virtual domains 730 and 735 may be merged into another virtual domain (step S533). The operation policy of the plurality of virtual domains may be changed (step S535). Step S531 may be similar to step S511b in FIG. 17.

For example, when at least one of the conditions in step S531 is satisfied while the first and second virtual domains 730 and 735 are implemented as illustrated in FIG. 13A, the first and second virtual domains 730 and 735 may be merged into a third virtual domain 731e as illustrated in FIG. 24A. In other words, the first and second virtual domains 730 and 735 may be merged into a single virtual domain. For example, the third virtual domain 731e may include the first and second virtual blocks VB11 to VB1N and VB21 to VB2N, and the physical blocks PB11 to PB1K and PB21 to PB2K may be allocated to the third virtual domain 731e. The third virtual domain 731e may include a third page mapping table PMT3 and a third block mapping table BMT3.

In some example embodiments, as illustrated in FIG. 24B, some physical blocks PB1K and PB2K among the physical blocks PB11 to PB1K and PB21 to PB2K allocated to the first and second virtual domains 730 and 735 may not be allocated to the third virtual domain 731e while the first and second virtual domains 730 and 735 are merged. In this example, the physical blocks PB11 to PB1(K−1) and PB21 to PB2(K−1) may be finally allocated to a third virtual domain 731f.

In some example embodiments, the virtual domains may be dynamically changed by combining two or more of the examples described with reference to FIGS. 14, 15, 16, 17, 18, 19, 20, 21A, 21B, 22, 23, 24A and 24B.

Figure 25:
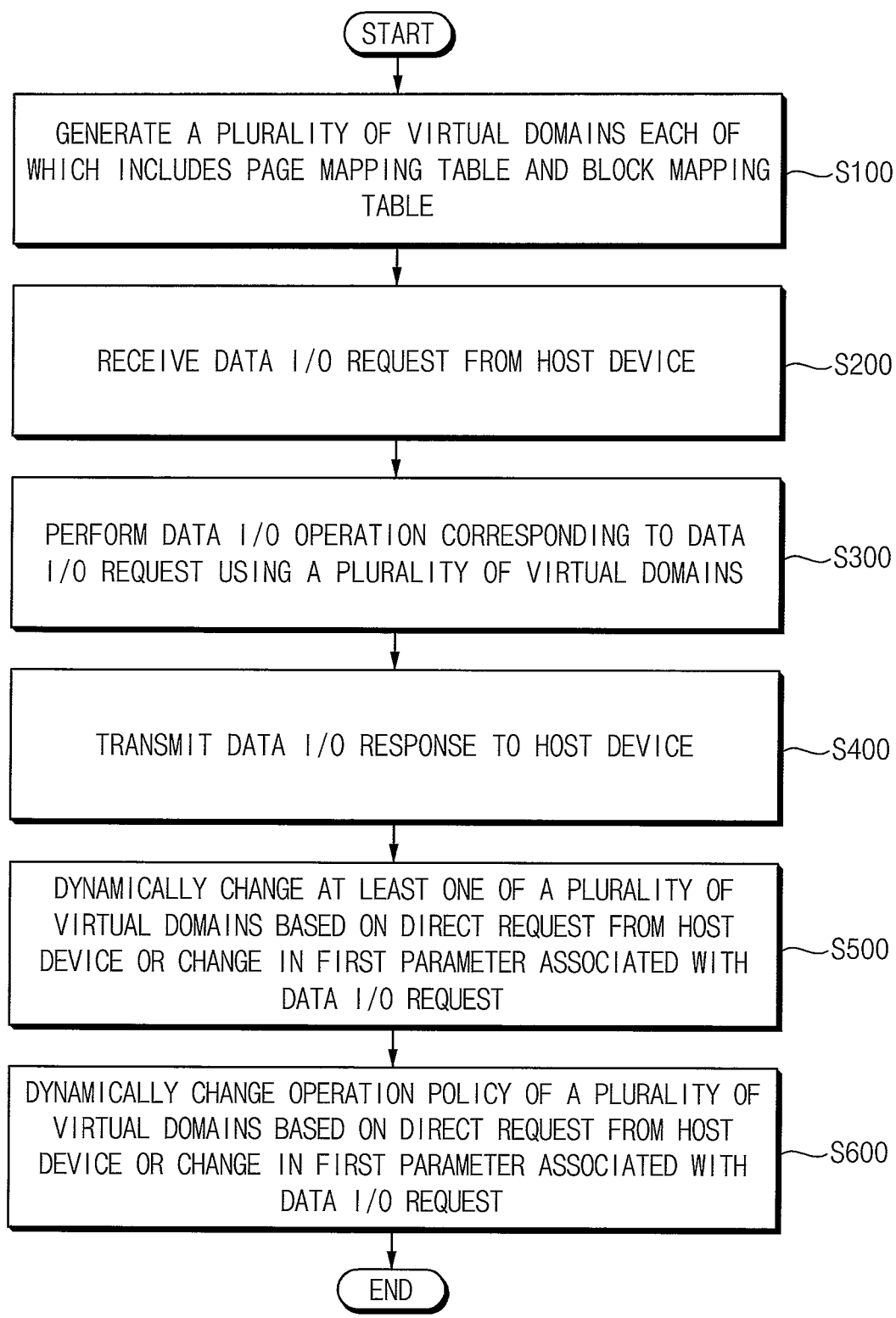
FIGS. 25 and 26 are flowcharts illustrating a method of operating a storage device according to example embodiments.
Figure 26:
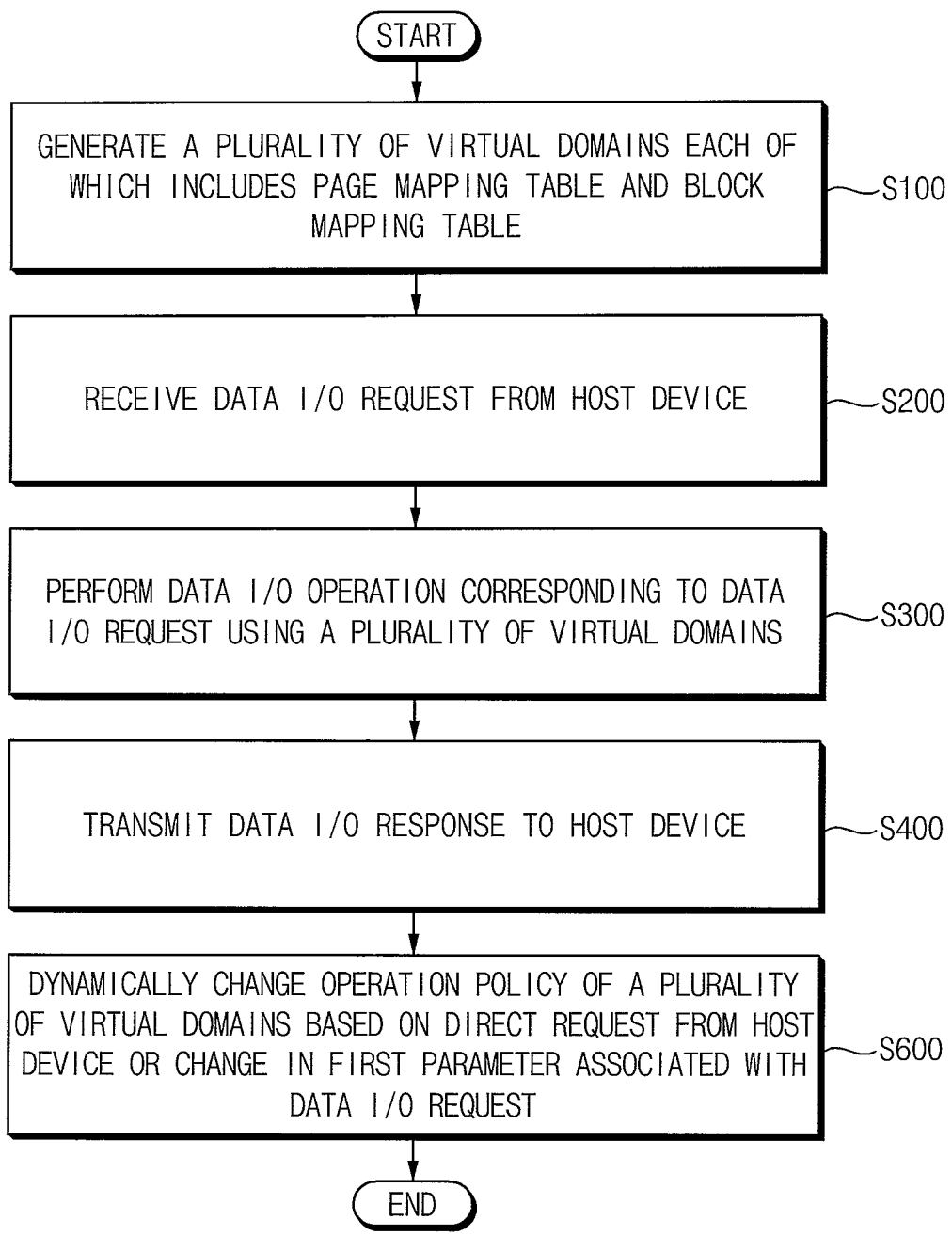

FIGS. 25 and 26 are flowcharts illustrating a method of operating a storage device according to example embodiments. The descriptions repeated with FIG. 1 will be omitted.

Referring to FIG. 25, in a method of operating a storage device according to example embodiments, steps S100, S200, S300, S400 and S500 may be substantially the same as those described with reference to FIG. 1.

After step S500, the operation policy of the plurality of virtual domains is dynamically changed based on the direct request from the host device or the change in the first parameter associated with the data I/O request (step S600). While dynamically changing the configuration of the virtual domains, the operation policy for selecting the virtual domains may also be dynamically changed.

Referring to FIG. 26, in a method of operating a storage device according to example embodiments, steps S100, S200, S300 and S400 may be substantially the same as those described with reference to FIG. 1, and step S600 may be substantially the same as that described with reference to FIG. 25. In other words, only the operation policy may be dynamically changed without changing the virtual domains. For example, step S500 may not be performed in the method of FIG. 26.

According to example embodiments, the virtual storage space may be additionally implemented, the block mapping table BMT may be added to operate the virtual storage space, and the storage device may be accessed by performing the two-level address translation of logical address-virtual address-physical address. The physical blocks used in the virtual domain may be dynamically allocated from the physical block pool 720 as needed, may be used, and may be returned as needed. When different workloads are applied after generating two logical storage spaces, the performance and/or the QoS may be adaptively changed depending on a change in the workload.

Although example embodiments are described based on the two-level address translation, example embodiments are not limited thereto, and example embodiments may be implemented based on a three (or more)-level address translation.

Figure 27:
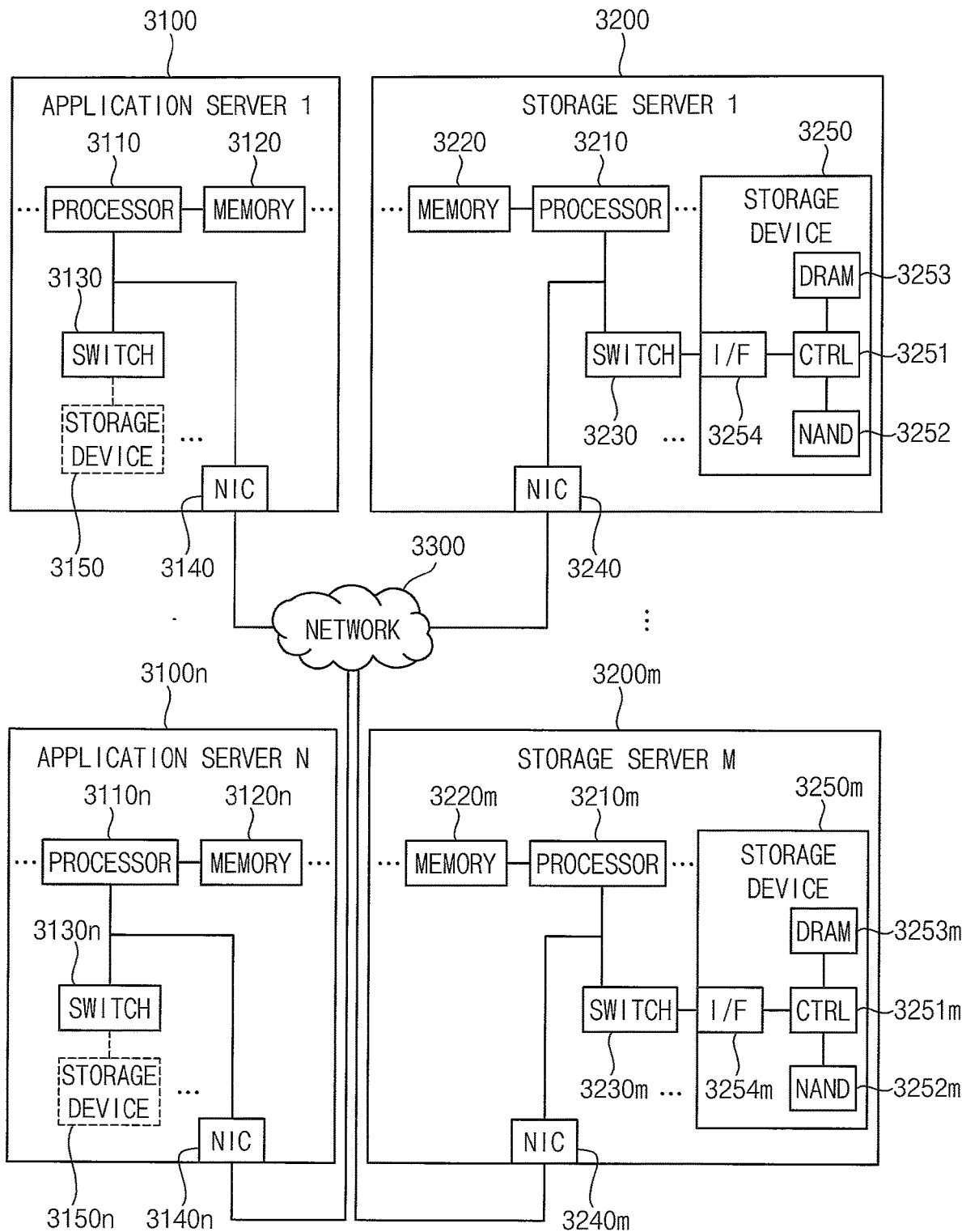
FIG. 27 is a block diagram illustrating a data center including a storage device according to example embodiments.

FIG. 27 is a block diagram illustrating a data center including a storage device according to example embodiments.

Referring to FIG. 27, a data center 3000 may be a facility that collects various types of data and provides various services, and may be referred to as a data storage center. The data center 3000 may be a system for operating search engines and databases, and may be a computing system used by companies such as banks or government agencies. The data center 3000 may include application servers 3100 to 3100n and storage servers 3200 to 3200m. The number of the application servers 3100 to 3100n and the number of the storage servers 3200 to 3200m may be variously selected according to example embodiments, and the number of the application servers 3100 to 3100n and the number of the storage servers 3200 to 3200m may be different from each other.

The application server 3100 may include at least one processor 3110 and at least one memory 3120, and the storage server 3200 may include at least one processor 3210 and at least one memory 3220. An operation of the storage server 3200 will be described as an example. The processor 3210 may control overall operations of the storage server 3200, and may access the memory 3220 to execute instructions and/or data loaded in the memory 3220. The memory 3220 may include at least one of a double data rate (DDR) synchronous dynamic random access memory (SDRAM), a high bandwidth memory (HBM), a hybrid memory cube (HMC), a dual in-line memory module (DIMM), an Optane DIMM, a nonvolatile DIMM (NVDIMM), etc. The number of the processors 3210 and the number of the memories 3220 included in the storage server 3200 may be variously selected according to example embodiments. In some example embodiments, the processor 3210 and the memory 3220 may provide a processor-memory pair. In some example embodiments, the number of the processors 3210 and the number of the memories 3220 may be different from each other. The processor 3210 may include a single core processor or a multiple core processor. The above description of the storage server 3200 may be similarly applied to the application server 3100. The application server 3100 may include at least one storage device 3150, and the storage server 3200 may include at least one storage device 3250. In some example embodiments, the application server 3100 may not include the storage device 3150. The number of the storage devices 3250 included in the storage server 3200 may be variously selected according to example embodiments.

The application servers 3100 to 3100n and the storage servers 3200 to 3200m may communicate with each other through a network 3300. The network 3300 may be implemented using a fiber channel (FC) or an Ethernet. The FC may be a medium used for a relatively high speed data transmission, and an optical switch that provides high performance and/or high availability may be used. The storage servers 3200 to 3200m may be provided as file storages, block storages or object storages according to an access scheme of the network 3300.

In some example embodiments, the network 3300 may be a storage-only network or a network dedicated to a storage such as a storage area network (SAN). For example, the SAN may be an FC-SAN that uses an FC network and is implemented according to an FC protocol (FCP). For another example, the SAN may be an IP-SAN that uses a transmission control protocol/internet protocol (TCP/IP) network and is implemented according to an iSCSI (a SCSI over TCP/IP or an Internet SCSI) protocol. In other example embodiments, the network 3300 may be a general network such as the TCP/IP network. For example, the network 3300 may be implemented according to at least one of protocols such as an FC over Ethernet (FCoE), a network attached storage (NAS), a nonvolatile memory express (NVMe) over Fabrics (NVMe-oF), etc.

Hereinafter, example embodiments will be described based on the application server 3100 and the storage server 3200. The description of the application server 3100 may be applied to the other application server 3100n, and the description of the storage server 3200 may be applied to the other storage server 3200m.

The application server 3100 may store data requested to be stored by a user or a client into one of the storage servers 3200 to 3200m through the network 3300. In addition, the application server 3100 may obtain data requested to be read by the user or the client from one of the storage servers 3200 to 3200m through the network 3300. For example, the application server 3100 may be implemented as a web server or a database management system (DBMS).

The application server 3100 may access a memory 3120n or a storage device 3150n included in the other application server 3100n through the network 3300, and/or may access the memories 3220 to 3220m or the storage devices 3250 to 3250*m* included in the storage servers 3200 to 3200*m* through the network 3300. Thus, the application server 3100 may perform various operations on data stored in the application servers 3100 to 3100*n* and/or the storage servers 3200 to 3200*m*. For example, the application server 3100 may execute a command for moving or copying data between the application servers 3100 to 3100*n* and/or the storage servers 3200 to 3200*m*. The data may be transferred from the storage devices 3250 to 3250*m* of the storage servers 3200 to 3200*m* to the memories 3120 to 3120*n* of the application servers 3100 to 3100*n* directly or through the memories 3220 to 3220*m* of the storage servers 3200 to 3200*m*.

For example, the data transferred through the network 3300 may be encrypted data for security or privacy.

In the storage server 3200, an interface 3254 of the storage device 3250 may provide a physical connection between the processor 3210 and a controller 3251 of the storage device 3250 and/or a physical connection between a network interface card (NIC) 3240 and the controller 3251. For example, the interface 3254 may be implemented based on a direct attached storage (DAS) scheme in which the storage device 3250 is directly connected with a dedicated cable. For example, the interface 3254 may be implemented based on at least one of various interface schemes such as an advanced technology attachment (ATA), a serial ATA (SATA) an external SATA (e-SATA), a small computer system interface (SCSI), a serial attached SCSI (SAS), a peripheral component interconnection (PCI), a PCI express (PCIe), an NVMe, a compute express link (CXL), an IEEE 1394, a universal serial bus (USB), a secure digital (SD) card interface, a multi-media card (MMC) interface, an embedded MMC (eMMC) interface, a universal flash storage (UFS) interface, an embedded UFS (eUFS) interface, a compact flash (CF) card interface, etc.

The storage server 3200 may further include a switch 3230 and the NIC 3240. The switch 3230 may selectively connect the processor 3210 with the storage device 3250 or may selectively connect the MC 3240 with the storage device 3250 under a control of the processor 3210. Similarly, the application server 3100 may further include a switch 3130 and an NIC 3140.

In some example embodiments, the NIC 3240 may include a network interface card, a network adapter, or the like. The NIC 3240 may be connected to the network 3300 through a wired interface, a wireless interface, a Bluetooth interface, an optical interface, or the like. The NIC 3240 may further include an internal memory, a digital signal processor (DSP), a host bus interface, or the like, and may be connected to the processor 3210 and/or the switch 3230 through the host bus interface. The host bus interface may be implemented as one of the above-described examples of the interface 3254. In some example embodiments, the NIC 3240 may be integrated with at least one of the processor 3210, the switch 3230 and the storage device 3250.

In the storage servers 3200 to 3200*m* and/or the application servers 3100 to 3100*n*, the processor may transmit a command to the storage devices 3150 to 3150*n* and 3250 to 3250*m* or the memories 3120 to 3120*n* and 3220 to 3220*m* to program or read data. For example, the data may be error-corrected data by an error correction code (ECC) engine. For example, the data may be processed by a data bus inversion (DBI) or a data masking (DM), and may include a cyclic redundancy code (CRC) information. For example, the data may be encrypted data for security or privacy.

The storage devices 3150 to 3150*m* and 3250 to 3250*m* may transmit a control signal and command/address signals to NAND flash memory devices 3252 to 3252*m* of the storage devices 3250 and 3250*m* in response to a read command received from the processor. When data is read from the NAND flash memory devices 3252 to 3252*m*, a read enable (RE) signal may be input as a data output control signal and may serve to output data to a DQ bus. A data strobe signal (DQS) may be generated using the RE signal. The command and address signals may be latched in a page buffer based on a rising edge or a falling edge of a write enable (WE) signal.

The controller 3251 may control overall operations of the storage device 3250. In some example embodiments, the controller 3251 may include a static random access memory (SRAM). The controller 3251 may write data into the NAND flash memory device 3252 in response to a write command, or may read data from the NAND flash memory device 3252 in response to a read command. For example, the write command and/or the read command may be provided from the processor 3210 in the storage server 3200, the processor 3210*m* in the other storage server 3200*m*, or the processors 3110 to 3110*n* in the application servers 3100 to 3100*n*. A DRAM 3253 in the storage device 3250 may temporarily store (e.g., may buffer) data to be written to the NAND flash memory device 3252 or data read from the NAND flash memory device 3252. Further, the DRAM 3253 may store meta data. The meta data may be data generated by the controller 3251 to manage user data or the NAND flash memory device 3252.

Each of the storage devices 3250 to 3250*m* may be the storage device according to example embodiments, and may perform the method of operating the storage device according to example embodiments.

Example embodiments of the present disclosure may be applied to various electronic devices and systems that include the storage devices and the storage systems. For example, the example embodiments may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments. Accordingly, all such modifications are intended to be included within the scope of the example embodiments as set forth in the claims.

What is claimed is:

1. A method of operating a storage device including a nonvolatile memory, the method comprising:
   generating a plurality of virtual domains, wherein each of the plurality of virtual domains includes a page mapping table and a block mapping table, the page mapping table including a relationship between a logical address received from a host device and a virtual address of a virtual block, the block mapping table including a relationship between the virtual address and a physical address of a physical block included in the nonvolatile memory;
   receiving a data input/output (I/O) request from the host device;

performing a data I/O operation corresponding to the data I/O request using the plurality of virtual domains;

transmitting a data I/O response to the host device in response to the data I/O request and the data I/O operation; and changing at least one of the plurality of virtual domains based on a change in a first parameter associated with the data I/O request, wherein, in response to the first parameter associated with the data I/O request being changed, a second parameter associated with the data I/O response is changed by changing at least one of the plurality of virtual domains and by performing the data I/O operation using the changed virtual domain, and wherein changing at least one of the plurality of virtual domains includes:

changing first physical blocks allocated to a first virtual domain, wherein the first physical blocks are from among a plurality of physical blocks included in the nonvolatile memory.

2. The method of claim 1, wherein generating the plurality of virtual domains includes:

selecting a first physical block from among the plurality of physical blocks included in the nonvolatile memory;

allocating the first physical block to a first virtual block included in a first virtual domain of the plurality of virtual domains;

generating a first block mapping table included in the first virtual domain;

initializing a first page mapping table included in the first virtual domain and corresponding to the first block mapping table; and setting an operation policy of the first virtual domain.

3. The method of claim 2, wherein generating the plurality of virtual domains further includes:

in response to all of the plurality of physical blocks being in use, retrieving the first physical block from a second virtual domain to which the first physical block is allocated.

4. The method of claim 1, wherein performing the data I/O operation includes:

dividing the data I/O request into a plurality of sub I/O requests;

distributing the plurality of sub I/O requests to the plurality of virtual domains based on an operation policy of the plurality of virtual domains, and performing a plurality of sub data I/O operations corresponding to the plurality of sub I/O requests.

5. The method of claim 4, wherein performing the plurality of sub data I/O operations includes:

translating a first logical address included in a first sub I/O request of the plurality of sub I/O requests into a first virtual address;

translating the first virtual address into a first physical address; and performing a data write operation or a data read operation on a first physical block corresponding to the first physical address, wherein the first physical block is one of the plurality of physical blocks included in the nonvolatile memory.

6. The method of claim 1, wherein:

the first parameter includes a workload, a performance requirement, or a quality of service (QOS) requirement associated with each of the plurality of virtual domains, and the second parameter includes a latency of the data I/O response.

7. The method of claim 1, wherein changing the first physical blocks allocated to the first virtual domain includes:

in response to a workload associated with the first virtual domain being greater than a reference workload, or in response to a performance requirement associated with the first virtual domain being higher than a reference performance, or in response to a quality of service (QOS) requirement associated with the first virtual domain being higher than a reference QoS, additionally allocating at least one of the plurality of physical blocks to the first virtual domain.

8. The method of claim 7, wherein:

the nonvolatile memory is connected to a plurality of channels and a plurality of ways, and a first quantity of channels and ways that are enabled while accessing the first virtual domain to which the first physical blocks are allocated is less than a second quantity of channels and ways that are enabled while accessing the first virtual domain to which the first physical blocks are allocated and to which the at least one physical block is additionally allocated.

9. The method of claim 1, wherein changing the first physical blocks allocated to the first virtual domain includes:

in response to a workload associated with the first virtual domain being less than a reference workload, or in response to a performance requirement associated with the first virtual domain being lower than a reference performance, or in response to a quality of service (QOS) requirement associated with the first virtual domain being lower than a reference QoS, deallocating at least one of the first physical blocks allocated to the first virtual domain.

10. The method of claim 9, wherein:

the nonvolatile memory is connected to a plurality of channels and a plurality of ways, and a first quantity of channels and ways that are enabled while accessing the first virtual domain to which the first physical blocks are allocated is greater than a second quantity of channels and ways that are enabled while accessing the first virtual domain from which at least one of the first physical blocks is deallocated.

11. The method of claim 1, further comprising:

changing an operation policy of the plurality of virtual domains based on the change in the first parameter associated with the data I/O request.

12. A storage device, comprising:

a storage controller; and a nonvolatile memory controlled by the storage controller, wherein the storage controller is configured to:

generate a plurality of virtual domains, wherein each of the plurality of virtual domains includes a page mapping table and a block mapping table, the page mapping table including a relationship between a logical address received from a host device and a virtual address of a virtual block, the block mapping table including a relationship between the virtual address and a physical address of a physical block included in the nonvolatile memory;

receive a data input/output (I/O)) request from the host device;

perform a data I/O operation corresponding to the data I/O request using the plurality of virtual domains;

transmit a data I/O response to the host device in response to the data I/O request and the data I/O operation; and change at least one of the plurality of virtual domains based on a change in a first parameter associated with the data I/O request, wherein, in response to the first parameter associated with the data I/O request being changed, a second parameter associated with the data I/O response is changed by changing at least one virtual domain of the plurality of virtual domains and by performing the data I/O operation using the changed virtual domain, and wherein changing at least one of the plurality of virtual domains includes:

changing first physical blocks allocated to a first virtual domain, wherein the first physical blocks are from among a plurality of physical blocks included in the nonvolatile memory.

13. A method of operating a storage device including a storage controller and a nonvolatile memory, the storage device configured to communicate with a host device, the method comprising:

generating, by the storage controller, a plurality of virtual domains each of which includes a page mapping table and a block mapping table, the page mapping table including a relationship between a logical address received from the host device and a virtual address of a virtual block, the block mapping table including a relationship between the virtual address and a physical address of a physical block included in the nonvolatile memory;

receiving, by the storage controller, a data input/output (I/O) request from the host device;

performing, by the storage controller, a data I/O operation corresponding to the data I/O request, wherein performing the data I/O operation includes:

dividing the data I/O request into a plurality of sub I/O requests;

distributing the plurality of sub I/O requests to the plurality of virtual domains;

translating a plurality of logical addresses included in the plurality of sub I/O requests into a plurality of virtual addresses;

translating the plurality of virtual addresses into a plurality of physical addresses; and performing a data write operation or a data read operation on a plurality of physical blocks corresponding to the plurality of physical addresses;

transmitting, by the storage controller, a data I/O response to the host device in response to the data I/O request and the data I/O operation;

changing, by the storage controller, at least one of the plurality of virtual domains based on a direct request from the host device; and changing, by the storage controller, an operation policy of the plurality of virtual domains based on the direct request from the host device, wherein changing at least one of the plurality of virtual domains includes:

changing first physical blocks allocated to a first virtual domain, wherein the first physical blocks are from among a plurality of physical blocks included in the nonvolatile memory.

* * * * *